US010405290B2

(12) United States Patent
Griffioen

(10) Patent No.: US 10,405,290 B2
(45) Date of Patent: *Sep. 3, 2019

(54) TECHNIQUE TO ALIGN FRAME TIMING OF REMOTE CELLULAR RADIO ELEMENTS WITH THE DATA FRAME TIMING REFERENCE OF RADIO ELEMENT

(71) Applicant: Telefonaktiebolaget LM Ericsson (publ), Stockholm (SE)

(72) Inventor: Robert Griffioen, Ottawa (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 15/307,973

(22) PCT Filed: May 14, 2015

(86) PCT No.: PCT/IB2015/053571
§ 371 (c)(1),
(2) Date: Oct. 31, 2016

(87) PCT Pub. No.: WO2015/173772
PCT Pub. Date: Nov. 19, 2015

(65) Prior Publication Data
US 2017/0064653 A1    Mar. 2, 2017

Related U.S. Application Data

(63) Continuation-in-part of application No. 14/491,129, filed on Sep. 19, 2014, now Pat. No. 9,699,751, and
(Continued)

(51) Int. Cl.
*H04W 56/00* (2009.01)
*H04W 88/08* (2009.01)
*H04L 29/06* (2006.01)

(52) U.S. Cl.
CPC ..... *H04W 56/002* (2013.01); *H04W 56/0085* (2013.01); *H04L 63/029* (2013.01); *H04L 63/164* (2013.01); *H04W 88/085* (2013.01)

(58) Field of Classification Search
CPC .. H04L 63/029; H04L 63/164; H04W 56/002; H04W 56/0085; H04W 88/085
(Continued)

(56) References Cited

U.S. PATENT DOCUMENTS 6,628,697 B1   9/2003  Douglas et al.
7,646,751 B2   1/2010  Osterling et al.
(Continued)

FOREIGN PATENT DOCUMENTS

CN   103002601 A    3/2013
EP     1630979 A1    3/2006
(Continued)

OTHER PUBLICATIONS

Author Unknown, "Common Public Radio Interface (CPRI); Interface Specification," CPRI Specification, V1.4, Mar. 31, 2006, 64 pages.
(Continued)

*Primary Examiner* — Omar J Ghowrwal
*Assistant Examiner* — Kokou R Detse
(74) *Attorney, Agent, or Firm* — Withrow & Terranova, PLLC

(57) ABSTRACT

Systems and methods for measuring end-to-end data path delays between a Radio Equipment Controller (REC) and a Radio Equipment (RE) of a base station are disclosed. In one embodiment, a system includes a RE configured to transmit an uplink chirped sine wave signal from the RE to a REC on an uplink data path from the RE to the REC via an asynchronous communication network. The REC is configured to correlate a reference chirped sine wave signal and a
(Continued)

received signal from the RE. The REC is further configured to determine an uplink data path delay from the RE to the REC based on results of the correlation of the reference chirped sine wave signal and the received signal from the RE on the uplink data path. In another embodiment, a downlink data path delay is measured in a similar manner.

34 Claims, 14 Drawing Sheets

Related U.S. Application Data a continuation of application No. 14/277,228, filed on May 14, 2014, now Pat. No. 9,554,347.

(58) Field of Classification Search
USPC .......................................................... 370/350
See application file for complete search history.

(56) References Cited

U.S. PATENT DOCUMENTS

| | | | |
|---|---|---|---|
| 7,773,578 B2 | 8/2010 | Liu | |
| 7,817,603 B2 | 10/2010 | Liu | |
| 7,940,667 B1 | 5/2011 | Coady et al. | |
| 8,422,484 B2 | 4/2013 | Iwai et al. | |
| 8,599,827 B2 | 12/2013 | Irvine | |
| 8,774,109 B2 | 7/2014 | Kenington et al. | |
| 8,842,649 B2 | 9/2014 | Liu et al. | |
| 2007/0058654 A1* | 3/2007 | Arnold | H04L 63/0428 370/437 |
| 2009/0089652 A1 | 4/2009 | Chi et al. | |
| 2009/0245228 A1 | 10/2009 | Osterling | |
| 2009/0291681 A1 | 11/2009 | Hara | |
| 2011/0310881 A1 | 12/2011 | Kenington | |
| 2011/0310941 A1 | 12/2011 | Kenington | |
| 2013/0100948 A1* | 4/2013 | Irvine | H04J 3/0632 370/350 |
| 2014/0185601 A1 | 7/2014 | Ilyadis | |
| 2015/0304971 A1 | 10/2015 | Shor et al. | |
| 2015/0334666 A1* | 11/2015 | Griffioen | H04W 56/002 370/350 |
| 2015/0334671 A1 | 11/2015 | Griffioen | |

FOREIGN PATENT DOCUMENTS

| | | |
|---|---|---|
| EP | 1744572 A1 | 1/2007 |
| EP | 2234442 A2 | 9/2010 |
| EP | 2367311 A2 | 9/2011 |
| WO | 2006040653 A1 | 4/2006 |
| WO | 2009089652 A1 | 7/2009 |
| WO | 2013070613 A1 | 5/2013 |
| WO | 2013189553 A1 | 12/2013 |
| WO | 2014005759 A1 | 1/2014 |
| WO | 2015001389 A1 | 1/2015 |
| WO | 2015173754 A1 | 11/2015 |
| WO | 2017077361 A1 | 5/2017 |

OTHER PUBLICATIONS

Author Unknown, "Common Public Radio Interface (CPRI); Interface Specification," CPRI Specification V2.0, Oct. 1, 2004, 75 pages.
Author Unknown, "Common Public Radio Interface (CPRI); Interface Specification," CPRI Specification, V4.0, Jun. 30, 2008, 96 pages.
Benesty, Jacob, et al., "Time Delay Estimation via Minimum Entropy," IEEE Signal Processing Letters, vol. 14, No. 3, Mar. 2007, pp. 157-160.
Non-Final Office Action for U.S. Appl. No. 14/491,129, dated Mar. 10, 2016, 14 pages.
Non-Final Office Action for U.S. Appl. No. 14/491,129, dated Oct. 21, 2016, 22 pages.
International Search Report and Written Opinion for International Patent Application No. PCT/IB2015/053539, dated Aug. 27, 2015, 13 pages.
International Search Report and Written Opinion for International Patent Application No. PCT/IB2015/053571, dated Aug. 27, 2015, 14 pages.
Non-Final Office Action for U.S. Appl. No. 14/277,228, dated Mar. 11, 2016, 11 pages.
International Search Report and Written Opinion for International Patent Application No. PCT/IB2015/053535, dated Aug. 27, 2015, 10 pages.
Notice of Allowance and Examiner-Initiated Interview Summary for U.S. Appl. No. 14/491,129, dated Apr. 26, 2017, 19 pages.
Notice of Allowance for U.S. Appl. No. 14/277,228, dated Nov. 23, 2016, 5 pages.
International Search Report and Written Opinion for International Patent Application No. PCT/IB2015/058476, dated Jul. 26, 2016, 12 pages.
Search Report for Chinese Patent Application No. 2015800856433, dated May 15, 2019, 2 pages.
First Office Action for Chinese Patent Application No. 2015800856433, dated Jun. 5, 2019, 37 pages.

* cited by examiner

TECHNIQUE TO ALIGN FRAME TIMING OF REMOTE CELLULAR RADIO ELEMENTS WITH THE DATA FRAME TIMING REFERENCE OF RADIO ELEMENT

This application is a 35 U.S.C. § 371 national phase filing of International Application No. PCT/IB2015/053571, filed May 14, 2015, which claims the benefit of U.S. application Ser. No. 14/491,129, filed Sep. 19, 2014, now U.S. Pat. No. 9,699,751, and U.S. application Ser. No. 14/277,228, filed May 14, 2014, now U.S. Pat. No. 9,554,347, the disclosures of which are incorporated herein by reference in their entireties.

FIELD OF THE DISCLOSURE

The present disclosure relates to a base station in a cellular communication network and more particularly relates to compensation of radio equipment processing delays.

BACKGROUND

In wireless, or cellular, communication networks, it is important that the downlink and uplink frame timing be synchronized between a base station and mobile devices served by the base station. The mobile devices connected to the base station use the same transmit and receive frequencies.

To ensure that there is no interference between the mobile devices, the mobile devices are assigned time slots or sub-channel frequencies depending on the type of multiplexing (e.g., Time Division Duplex (TDD) or Frequency Division Duplex (FDD)). In either case, frame timing must be precisely maintained over radio links between the base station and the mobile devices.

As shown in FIG. 1, timing must be aligned between a Radio Equipment Controller (REC) 10 and a Radio Equipment (RE) 12 such that the first sample of the Downlink (DL) radio frame is transmitted into the air, i.e., reaches an Antenna Reference Point (ARP) 14, at the same time as the REC's transmit Basic Frame Transmit Reference Point (BFN@TRP) 16. Specifically, the following events all happen simultaneously: the REC's downlink and uplink internal frame timing reference (BFN@TRP), downlink frame (e.g., CPRI downlink frame) starts from the REC 10, the uplink frame (e.g., CPRI uplink frame) arrives at the REC 10, the downlink radio frame leaves the ARP, and the uplink radio frame arrives at the ARP. The allowed timing error in the radio is typically 20 nanoseconds (ns). This means that the first sample may reach the ARP 14 at the BFN@TRP 16 with a ±20 ns delay.

On the Uplink (UL) the first sample of the UL radio frame is the one received at the ARP 14 at the BFN@TRP. The allowed timing error in the radio is also 20 ns. This means that the sample marked by the radio as the first in the UL radio frame must have entered the ARP 14 at the BFN@TRP±20 ns.

For DL path delay compensation, the REC 10 advances the DL baseband data such that it arrives at the radio's ARP 14 point precisely when it starts out at the REC's transmit reference point 16 (BFN@TRP). The REC 10 computes the compensation using the measured DL delay to the radio and the radio DL processing delay the REC 10 receives from the radio during Common Public Radio Interface (CPRI) path setup.

For the UL path delay compensation, the radio uses path delay information received from the REC 10 and the radio's internal UL processing delay to advance the CPRI data such that the arrival time of this UL data is aligned with the outbound data. It is up to the radio to provide further internal timing compensation for each carrier and account for variations due to frequency, operating temperature, and component age on both the UL and DL data paths.

During radio production both the DL and UL data paths must be precisely calibrated for timing alignment. The in-equipment delay, or $T_{OFFSET}$, obtained at production and stored at each radio is then used for the synchronization process. For this to work, a large amount of delay calibration data must be stored in non-volatile memory. A radio must be re-calibrated after factory repairs and this process is complex and time consuming. In addition, with change in frequency, temperature, and component aging, the stored in-equipment delay can change, which results in timing errors. Although the equipment is designed to allow certain timing errors, wide variations can still occur. If such large variations occur, further calibration is required in the field, which is expensive, time consuming, and introduces maintenance problems.

As such, there is a need for an automatic delay calibration technique which eliminates the need to store calibration data with each radio.

SUMMARY

Systems and methods for measuring end-to-end data path delays between a Radio Equipment Controller (REC) and a Radio Equipment (RE) of a base station are disclosed. In one embodiment, a system includes an RE configured to transmit an uplink chirped sine wave signal from the RE to an REC on an uplink data path from the RE to the REC via an asynchronous communication network. The REC is configured to correlate a reference chirped sine wave signal and a received signal from the RE on the uplink data path via the asynchronous communication network, where the received signal from the RE includes the uplink chirped sine wave signal. The REC is further configured to determine an uplink data path delay from the RE to the REC based on results of the correlation of the reference chirped sine wave signal and the received signal from the RE on the uplink data path. In this manner, a measurement is made of the uplink data path delay to the REC across the asynchronous communication network. This is particularly beneficial for base station topologies where an REC is located far away from the RE.

In some embodiments, the uplink data path delay is a delay from a radio frequency receive port of the RE to a receive reference point in the REC.

In some embodiments, the uplink data path traverses one or more nodes between the RE and the REC in the asynchronous communication network.

In some embodiments, the RE is further configured to mix the uplink chirped sine wave signal and a predetermined uplink carrier frequency to provide an upconverted signal; inject the upconverted signal into a radio frequency receive port of the RE such that the upconverted signal passes through a radio frequency interface of the RE to provide samples of the uplink chirped sine wave signal at an output of the radio frequency interface; and transmit the samples of the uplink chirped sine wave signal on the uplink data path from the RE to the REC via the asynchronous communication network. The REC is further configured to receive a signal on the uplink data path via the asynchronous communication network comprising the samples of the uplink chirped sine wave signal transmitted from the RE to the REC on the uplink data path; correlate the samples of the received signal and the reference chirped sine wave signal; and determine the uplink data path delay from the RE to the REC based on results of the correlation of the samples of the received signal and the reference chirped sine wave signal.

In some embodiments, the RE is further configured to transmit the uplink chirped sine wave signal from the RE to the REC on the uplink data path from the RE to the REC via the asynchronous communication network, and the REC is further configured to correlate the reference chirped sine wave signal and the received signal from the RE and determine the uplink data path delay from the RE to the REC once in a predetermined period. In some embodiments, the predetermined period is a single radio frame.

In some embodiments, the REC is further configured to transmit a downlink chirped sine wave signal from the REC to the RE on a downlink data path from the REC to the RE via the asynchronous communication network. The RE is further configured to receive a signal on the downlink data path from the REC to the RE via the asynchronous communication network, the signal comprising the downlink chirped sine wave signal transmitted by the REC on the downlink data path from the REC to the RE; pass the signal received on the downlink data path through a radio frequency interface of the RE to provide a radio frequency output signal at a radio frequency transmit port of the RE; sample the radio frequency output signal to provide samples of the radio frequency output signal; and correlate the samples of the radio frequency output signal and the reference chirped sine wave signal. A downlink data path delay from the REC to the RE is determined based on results of the correlation of the samples of the radio frequency output signal and the reference chirped sine wave signal.

In some embodiments, the RE is further configured to determine the downlink data path delay from the REC to the RE based on the results of the correlation of the samples of the radio frequency output signal and the reference chirped sine wave signal.

In some embodiments, the RE is further configured to provide, to the REC, the results of the correlation of the samples of the radio frequency output signal and the reference chirped sine wave signal; and the REC is further configured to determine the downlink data path delay from the REC to the RE based on the results of the correlation of the samples of the radio frequency output signal and the reference chirped sine wave signal.

In some embodiments, the downlink data path delay is a delay from a transmit reference point in the REC to the radio frequency transmit port of the RE. In some embodiments, the downlink data path traverses one or more nodes between the RE and the REC in the asynchronous communication network.

In some embodiments, the REC is further configured to transmit the downlink chirped sine wave signal from the REC to the RE on the downlink data path from the REC to the RE, and the RE is further configured to determine the downlink data path delay from the REC to the RE once in a predetermined period. In some embodiments, the predetermined period is a single radio frame.

In some embodiments, a system includes an REC configured to transmit a downlink chirped sine wave signal from the REC to an RE on a downlink data path from the REC to the RE via an asynchronous communication network. The RE is configured to receive a signal on the downlink data path from the REC to the RE via the asynchronous communication network, the signal comprising the downlink chirped sine wave signal transmitted by the REC on the downlink data path from the REC to the RE; pass the signal received on the downlink data path through a radio frequency interface of the RE to provide a radio frequency output signal at a radio frequency transmit port of the RE; sample the radio frequency output signal to provide samples of the radio frequency output signal; and correlate the samples of the radio frequency output signal and a reference chirped sine wave signal. A downlink data path delay from the REC to the RE is determined based on results of the correlation of the samples of the radio frequency output signal and the reference chirped sine wave signal.

In some embodiments, the RE is further configured to determine the downlink data path delay from the REC to the RE based on the results of the correlation of the samples of the radio frequency output signal and the reference chirped sine wave signal.

In some embodiments, the RE is further configured to provide, to the REC, the results of the correlation of the samples of the radio frequency output signal and the reference chirped sine wave signal, and the REC is further configured to determine the downlink data path delay from the REC to the RE based on the results of the correlation of the samples of the radio frequency output signal and the reference chirped sine wave signal.

In some embodiments, the downlink data path delay is a delay from a transmit reference point in the REC to the radio frequency transmit port of the RE. In some embodiments, the downlink data path traverses one or more nodes between the REC and the RE in the asynchronous communication network.

In some embodiments, the REC is further configured to transmit the downlink chirped sine wave signal from the REC to the RE on the downlink data path from the REC to the RE, and the RE is further configured to determine the downlink data path delay from the REC to the RE once in a predetermined period. In some embodiments, the predetermined period is a single radio frame. In some embodiments, the asynchronous communication network is an Ethernet network. In some embodiments, the Ethernet network is encrypted. In some embodiments, the Ethernet network includes an Internet Protocol Security (IPsec) tunnel.

In some embodiments, an RE includes a radio frequency interface having a radio frequency transmit port and a radio frequency receive port; a communication interface configured to communicatively couple the RE to an REC via an asynchronous communication network; and circuitry. The circuitry is configured to mix an uplink chirped sine wave signal and a predetermined uplink carrier frequency to provide an upconverted signal; inject the upconverted signal into the radio frequency receive port of the radio frequency interface such that the upconverted signal passes through the radio frequency interface of the RE to thereby provide samples of the uplink chirped sine wave signal at an output of the radio frequency interface; and transmit the samples of the uplink chirped sine wave signal on an uplink data path from the RE to the REC via the communication interface via the asynchronous communication network.

In some embodiments, the uplink data path delay is a delay from a radio frequency receive port of the RE to a receive reference point in the REC.

In some embodiments, the circuitry is further configured to receive a signal on a downlink data path from the REC to the RE via the asynchronous communication network, the signal comprising a downlink chirped sine wave signal transmitted by the REC on the downlink data path from the REC to the RE; pass the signal received on the downlink data path through the radio frequency interface of the RE to provide a radio frequency output signal at the radio frequency transmit port of the RE; sample the radio frequency output signal to provide samples of the radio frequency output signal; and correlate the samples of the radio frequency output signal and a reference chirped sine wave signal.

In some embodiments, the circuitry is further configured to determine a downlink data path delay from the REC to the RE based on results of the correlation of the samples of the radio frequency output signal and the reference chirped sine wave signal. In some embodiments, the RE is further configured to provide, to the REC, results of the correlation of the samples of the radio frequency output signal and the reference chirped sine wave signal.

In some embodiments, the communication interface is an Ethernet interface. In some embodiments, the RE is further configured to transmit the uplink chirped sine wave signal from the RE to the REC on the uplink data path from the RE to the REC via the asynchronous communication network once in a predetermined period.

In some embodiments, an REC includes a communication interface configured to communicatively couple the REC to an RE via an asynchronous communication network, and circuitry. The circuitry is configured to correlate a reference chirped sine wave signal and a received signal from the RE on an uplink data path via the asynchronous communication network, the received signal comprising a chirped sine wave signal, and determine an uplink data path delay from the RE to the REC based on results of the correlation of the reference chirped sine wave signal and the received signal from the RE on the uplink data path.

In some embodiments, the uplink data path delay is a delay from a radio frequency receive port of the RE to a receive reference point in the REC. In some embodiments, the circuitry is further configured to transmit a downlink chirped sine wave signal from the REC to the RE on a downlink data path from the REC to the RE via the communication interface via the asynchronous communication network. In some embodiments, the communication interface is an Ethernet interface.

In some embodiments, the REC is further configured to correlate the reference chirped sine wave signal and the received signal from the RE and determine the uplink data path delay from the RE to the REC once in a predetermined period.

In some embodiments, a method of operation of a system comprising an RE connected to an REC for measuring end-to-end processing delay includes transmitting, by the RE, an uplink chirped sine wave signal from the RE to the REC on an uplink data path from the RE to the REC via an asynchronous communication network; correlating, by the REC, a reference chirped sine wave signal and a received signal from the RE on the uplink data path, the received signal comprising the chirped sine wave signal; and determining an uplink data path delay from the RE to the REC based on results of the correlation of the reference chirped sine wave signal and the received signal from the RE on the uplink data path.

In some embodiments, a method of operation of a system comprising an RE connected to an REC for measuring end-to-end processing delay includes transmitting, by the REC, a downlink chirped sine wave signal from the REC to the RE on a downlink data path from the REC to the RE via an asynchronous communication network; receiving, by the RE, a signal on the downlink data path from the REC to the RE, the signal comprising the downlink chirped sine wave signal transmitted by the REC on the downlink data path from the REC to the RE; passing, by the RE, the signal received on the downlink data path through a radio frequency interface of the RE to provide a radio frequency output signal at a radio frequency transmit port of the RE; sampling, by the RE, the radio frequency output signal to provide samples of the radio frequency output signal; correlating, by the RE, the samples of the radio frequency output signal and a reference chirped sine wave signal; and determining a downlink data path delay from the REC to the RE based on results of the correlation of the samples of the radio frequency output signal and the reference chirped sine wave signal.

In some embodiments, the asynchronous communication network is an Ethernet network. In some embodiments, the Ethernet network is encrypted. In some embodiments, the Ethernet network includes an IPsec tunnel.

Those skilled in the art will appreciate the scope of the present disclosure and realize additional aspects thereof after reading the following detailed description of the embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

DETAILED DESCRIPTION

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Before describing embodiments of the present disclosure, definitions of a few terms used throughout this description are beneficial. As used herein, a "chirped sine wave" or "chirp sine wave" is a signal which varies from a low frequency to a higher frequency. For example, in one embodiment, a chirped sine wave varies (e.g., linearly or exponentially) from, for example, 100 kilohertz (kHz) to 1 Megahertz (MHz).

"Cross correlation" is a signal processing technique used to measure similarity between two wave forms as a function of a time-lag applied to one of them. For example, in some embodiments, cross-correlation is used to measure a delay between a chirped sine wave signal and a reference chirped sine wave signal with a resolution of, e.g., ±1 nanoseconds (ns).

Figure 1:
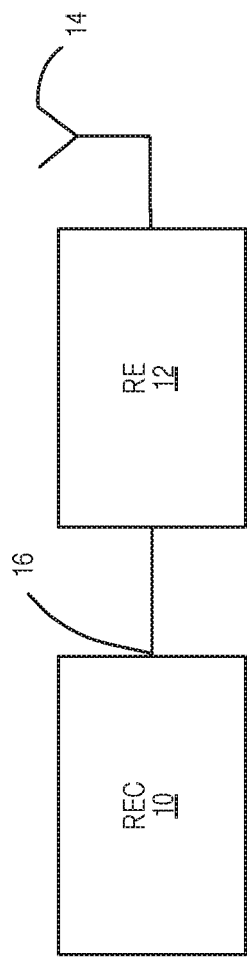
FIG. 1 is a block diagram of a typical base station which is typically comprised of a Radio Equipment Controller (REC) and a Radio Equipment (RE)

As indicated previously with reference to FIG. 1, in order to maintain precise frame timing, a number of delays are determined. The particular delays can be described as follows in relation to FIG. 2. According to the Common Public Radio Interface (CPRI) specification, a base station 20 includes a Radio Equipment Controller (REC) 22 and a Radio Equipment (RE) 24. The REC 22 is typically connected to the RE 24 via one or more cables, such as one or more fiber cables. The REC 22 includes radio functions in the digital baseband domain, whereas the RE 24 includes analog radio frequency functions. A generic interface between the REC 22 and the RE 24, which is referred to herein as a CPRI interface, enables communication between the REC 22 and the RE 24.

Figure 2:
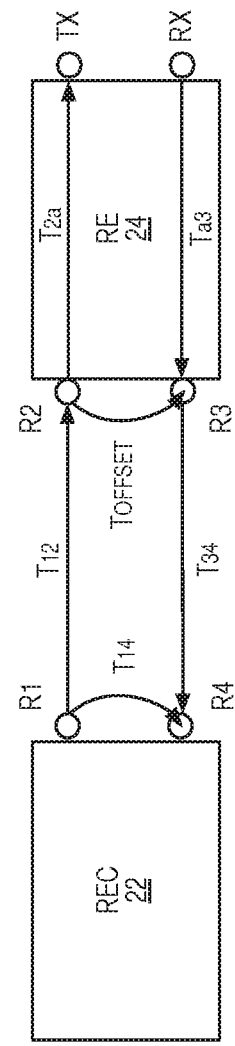
FIG. 2 is a block diagram of the base station of FIG. 1, along with various delays accounted for during conventional synchronization.

In order to maintain precise frame timing, a number of delays are determined. Specifically, as shown in FIG. 2, these delays include:

$T_{12}$: Cable delay ($T_{12}$) is a delay between an output interface (R1) of the REC 22 and an input interface (R2) of the RE 24 due to a cable connecting the output interface (R1) of the REC 22 to the input interface (R2) of the RE 24, $T_{OFFSET}$: In-equipment delay ($T_{OFFSET}$) is an internal delay of the RE 24 from the input interface (R2) of the RE 24 to an output interface (R3) of the RE 24, $T_{34}$: Cable delay ($T_{34}$) is a delay from the output interface (R3) of the RE 24 to an input interface (R4) of the REC 22 due to a cable connecting the output interface (R3) of the RE 24 to the input interface (R4) of the REC 22, $T_{14}$: Total round-trip delay ($T_{14}$) that is the sum of $T_{12}$, $T_{OFFSET}$, and $T_{34}$, $T_{2a}$: In-equipment downlink delay ($T_{2a}$) is an internal delay of the RE 24 from the input interface (R2) of the RE 24 to a Transmit Port (TX) or antenna of the RE 24, and $T_{a3}$: In-equipment uplink delay ($T_{a3}$) is an internal delay of the RE 24 from a Receive Port (RX) or antenna of the RE 24 to the output interface (R3) of the RE 24.

In operation, the RE 24 obtains the in-equipment delay ($T_{OFFSET}$), the in-equipment downlink delay ($T_{2a}$), and the in-equipment uplink delay ($T_{a3}$) and reports those estimates to the REC 22. The cable delays ($T_{12}$ and $T_{34}$) are then determined by the REC 22 using a synchronization process.

For the synchronization process, the REC 22 transmits a sync byte, which is referred to as a K28.5 sync byte in the CPRI specification, from the output interface (R1) of the REC 22 to the input interface (R2) of the RE 24. The RE 24 then passes the sync byte from the input interface (R2) of the RE 24 to the output interface (R3) of the RE 24 such that the sync byte is looped-back to the REC 22. Using the sync byte, the REC 22 measures the total round-trip delay ($T_{14}$), which is the amount of time between a time at which the sync byte was sent from the output interface (R1) of the REC 22 and a time at which the sync byte was received at the input interface (R4) of the REC 22. Then, the REC 22 computes the cable delays ($T_{12}$ and $T_{34}$) as:

$$T_{12} = T_{34} = \frac{(T_{14} - T_{OFFSET})}{2}$$

where $T_{14}$ is the total round-trip delay measured by the REC 22 using the sync byte.

Figure 3:
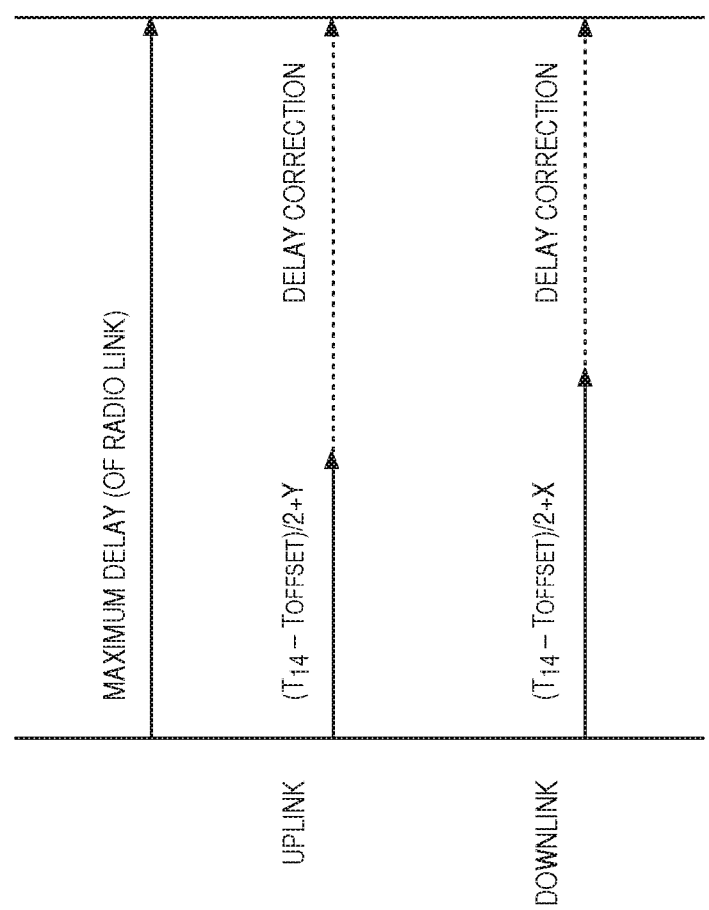
FIG. 3 illustrates the base station correction delay mismatch.

With reference to FIG. 3, the base station delays and required corrections are shown. As illustrated above, the base station 20 computes the connection cable delay using $(T_{14}-T_{OFFSET})/2$. The reported in-equipment delay and connection cable delay values are then used to compute the buffering to align the uplink and downlink frames over the CPRI link. The base station 20 corrects for the uplink and downlink mismatch. The Y (uplink in-equipment delay) and X (downlink in-equipment delay) are aligned using buffers inside the base station 20.

Figure 4:
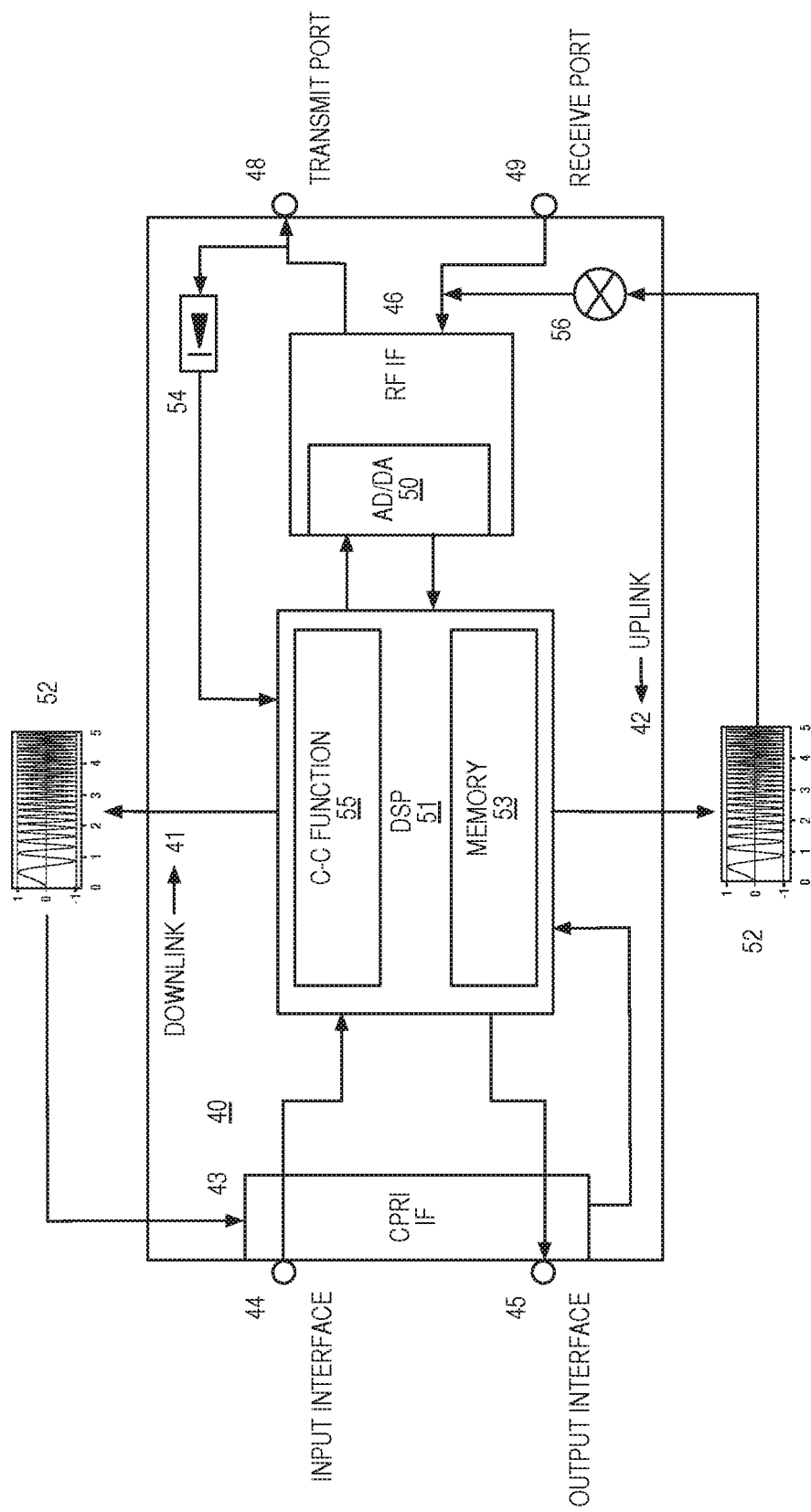
FIG. 4 is a block diagram of the RE for measuring actual in-equipment delays in the downlink and uplink directions according to one embodiment of the present disclosure.

With reference to FIG. 4, a block diagram of the radio equipment for measuring actual in-equipment delays in the downlink and uplink directions is illustrated according to one embodiment of the present disclosure. With the embodiments of the present disclosure, there are disclosed systems and methods for measuring end-to-end processing delay in an RE connected to an REC between an input interface and a transmit port in the downlink direction and a receive port and an output interface in the uplink direction. Once a downlink radio channel is activated at a predetermined carrier frequency, a chirped sine wave is added at the input interface such that it becomes mixed with the carrier frequency. Sampling of a received downlink mixed signal is then done at the transmit port once converted to an analog Radio Frequency (RF) signal. The sampled mixed signal is then cross-correlated with a reference chirped sine wave to obtain a signal phase shift and the signal phase shift is then converted to a time delay associated with the downlink processing delay of said RE. Similarly, once the uplink radio channel is activated at a predetermined carrier frequency, the received carrier frequency is mixed at the receive port with a chirped sine wave. Sampling of a received uplink mixed carrier frequency signal is then done at the output interface once the mixed signal is converted to a digital signal. The sampled mixed signal is then cross-correlated with the reference chirped sine wave to obtain a signal phase shift and then converted to a time delay associated with the uplink processing delay of the RE. The downlink and uplink processing delays are then added to obtain the time delay associated with the end-to-end processing delay of the RE.

One advantage of using the system and method of the present disclosure is that the RE re-computes its processing delay after each restart. This avoids having to store component age and operating frequency and temperature calibration data. As indicated above, this data is necessary to re-adjust the factory recorded delay data. Each RE has analog power amplifiers and filter components whose transit delay is affected by age and operating frequency and temperature. The digital components are not as affected by age but their transit delay is still affected by channel frequency and operating temperature.

Another advantage is that the RE can compute its processing delay for each new carrier setup request, such that the base station is provided with the most current RE processing delay information. When there are cellular network timing issues trouble shooters can use this precision measured data to determine root cause of timing failures. As this data has been measured by the RE for the current operating conditions, the technician does not have to repeat these measurements in the field.

Figure 5A:
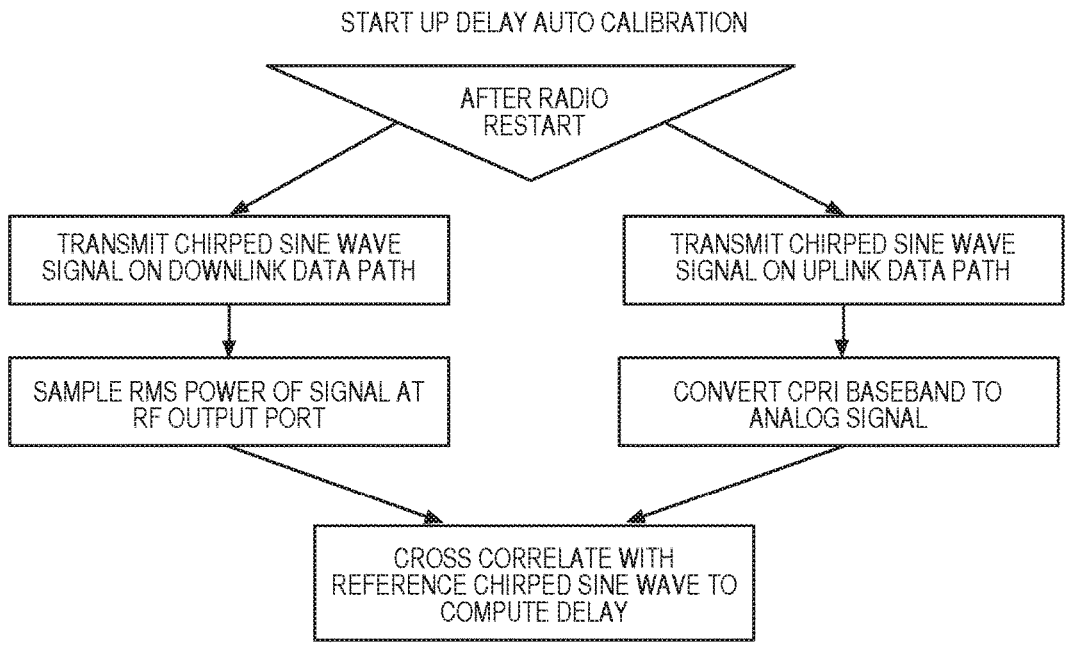
FIG. 5A is a flow chart illustrating a process for measuring in-equipment delay at start up.
Figure 5B:
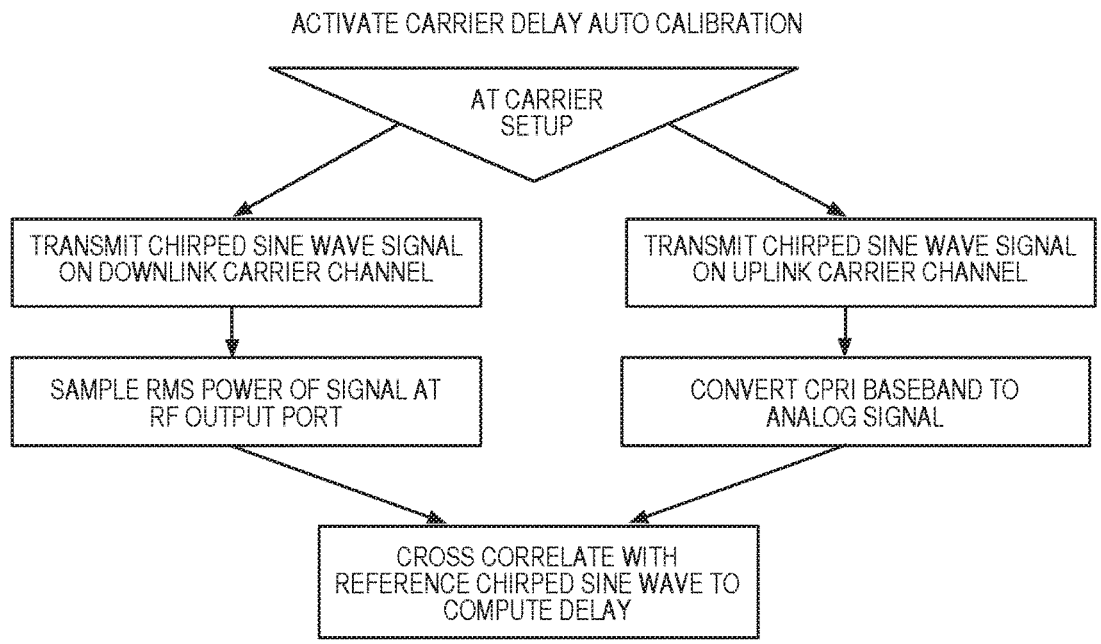
FIG. 5B is a flow chart illustrating a process for measuring in-equipment delay at carrier activation.

With reference to FIGS. 4, 5A, and 5B, a block and flow diagrams illustrate the RE auto calibration of processing delay according to an embodiment of the present disclosure. In an embodiment of the present disclosure, measurement of the end-to-end processing delay is done at start-up as shown in FIG. 5A and upon activation of a carrier as shown in FIG. 5B.

In FIG. 4, the in-equipment delay of an RE 40 is measured in the downlink 41 and uplink 42 directions. The RE is comprised of a CPRI interface 43 for interfacing with an REC (not shown) via an input interface 44 and an output interface 45. The RE also has an RF interface 46 for interfacing with RE antennas (not shown) via transmit port 48 and receive port 49. The RE also has a Digital-to-Analog (D/A) converter and an Analog-to-Digital (A/D) converter 50 at the RF interface 46 and a Digital Signal Processor (DSP) 51 to manage and control the automatic delay calibration functionalities of the RE 40.

In order to measure the in-equipment delay of the RE 40, on the downlink path 41, a low frequency chirped sine wave 52 is injected into the CPRI interface 43 at the input interface thereof 44. A chirped sine wave is a signal which varies from a low to a higher frequency. In one embodiment, the chirped sine wave varies from 100 kHz to 1 MHz. The chirped sine wave can be a digital signal either stored in memory 53 or generated on demand using simple trigonometric functions running in the DSP 51. At the CPRI interface 43, the chirped sine wave is added to the baseband section as data. The mixed downlink signal is passed through the RE, converted to an analog signal at the D/A and A/D converter 50 at the RF interface 46, and exits at the transmit port 48 as a downlink RF signal. The downlink RF signal is then sampled at the transmit port 48 by means of an RF microwave diode 54. The RF microwave diode 54 is used to sample the RF output power of the RF signal on the downlink channel. In one embodiment, the RF microwave diode 54 samples the Root Mean Square (RMS) output power at a rate at least double the baseband channel rate for 10 milliseconds (ms).

The output of the RF microwave diode 54 is fed to a cross-correlating function 55 of the DSP 51. Cross-correlation is a signal processing technique used to measure the similarity between two waveforms as a function of a time-lag applied to one of the waveforms. In the present embodiment, the added chirped sine wave signal is delayed as it travels the downlink data path of the RE from the input interface 44 to the transmit port 48 or the uplink data path from the receive port 49 to the output interface 45. The cross-correlation measures the delay to a resolution of +/−1 ns.

In the present embodiment, the cross-correlation is done against the original chirped sine wave to derive a phase shift between the original chirped sine wave and the recovered sine wave at the output of the RF microwave diode 54. Computation of the signal path delay from the cross-correlating function 55 is a common mathematical technique and need not be described further.

In order to measure the in-equipment delay of the RE 40, on the uplink path 42, the low frequency chirped sine wave 52 is mixed with the RF carrier frequency by means of a diode mixer 56 and then injected into the RF interface 46 at the receive port input thereof.

In the present embodiment, the diode mixer 56 mixes a 92.16 MHz chirped sine wave with an RF frequency corresponding to the carrier frequency of the uplink channel.

The mixed uplink signal is passed through the RE RF interface 46, converted to a digital signal, and is recovered at the output interface 45 of the CPRI interface 43 by sampling 10 ms of the received baseband signal.

The sampled output of the CPRI interface 43 is fed to the cross-correlating function 55 of the DSP 51. As for the downlink path, in the present embodiment, the cross-correlation is done against the original chirped sine wave to derive a phase shift between the original chirped sine wave and the recovered sine wave at the output interface 45 of the CPRI interface 43. Computation of the signal path delay is then done as before from the cross-correlating function 55. The downlink and uplink path delays are then combined to obtain the end-to-end processing delay of the RE 40 or $T_{OFFSET}$. These computed path delays are also used to provide precise time alignment adjustment on the uplink and downlink paths of the RE 40.

The embodiments described above relate to determining the in-equipment delay of an RE for the downlink and uplink paths (i.e., $T_{2a}$ and $T_{a3}$ illustrated in FIG. 2). The end-to-end delays for the uplink and downlink directions are then determined using conventional techniques. Specifically, the cable delays ($T_{12}$ and $T_{34}$) are measured as $$\frac{T_{14} - T_{OFFSET}}{2}.$$

The end-to-end downlink delay is then $T_{12}+T_{2a}$, and the end-to-end uplink delay is $T_{34}+T_{a3}$. Compensation is then applied to synchronize the uplink and downlink radio frames.

For downlink delay compensation, the REC advances the downlink baseband data such that the first sample of the downlink radio frame is transmitted into the air, i.e., reaches the Antenna Reference Point (ARP), at the REC's transmit reference point (Basic Frame Transmit Reference Point (BFN@TRP)). In order to do so, the REC transmits a corresponding CPRI frame starting at a time equal to $$BFN@TRP + \frac{T_{14} - T_{OFFSET}}{2} + T_{2a} + DLcorrection,$$

where DLcorrection is a downlink correction. In one embodiment, the downlink correction (DLcorrection) is selected such that $$\frac{T_{14} - T_{OFFSET}}{2} + T_{2a} + DLcorrection$$

is equal to a predefined maximum delay. Due to the cable delay $$\left(\frac{T_{14} - T_{OFFSET}}{2}\right),$$

the CPRI frame arrives at the RE at a time equal to BFN@TRP+$T_{2a}$+DLcorrection.

The RE applies a delay equal to the downlink correction (DLcorrection). As a result of the delay for the downlink correction (DLcorrection) and the actual in-equipment downlink delay ($T_{2a}$) of the RE, the downlink radio frame arrives at the ARP at a time that is equal to the BFN@TRP, within some predefined tolerance (e.g., ±20 ns).

Similarly, for uplink delay compensation, the first sample of the uplink radio frame is the sample received at the ARP of the RE at BFN@TRP. The RE applies a delay equal to an uplink correction (ULcorrection) such that, due to the delay for the uplink correction (ULcorrection), the actual in-equipment uplink delay ($T_{a3}$), and the cable delay $$\left(\frac{T_{14} - T_{OFFSET}}{2}\right),$$

the corresponding CPRI frame arrives at the REC at a time equal to $$BFN@TRP + \frac{T_{14} - T_{OFFSET}}{2} + T_{a3} + ULcorrection.$$

In one embodiment, the uplink correction (ULcorrection) is selected such that $$\frac{T_{14} - T_{OFFSET}}{2} + T_{a3} + ULcorrection$$

is equal to the predefined maximum delay. By selecting DLcorrection and ULcorrection such that both $$\frac{T_{14} - T_{OFFSET}}{2} + T_{2a} + DLcorrection \text{ and } \frac{T_{14} - T_{OFFSET}}{2} + T_{a3} + ULcorrection$$

are both equal to the predefined maximum delay, the uplink and downlink frame timing is aligned.

In one example implementation, the allowed time error tolerance in the base station is summarized as:

| Tolerance | Node element |
| --- | --- |
| +/−10 ns | REC interface |
| +/−15 ns | RE interface |
| +/−35 ns | Path delay compensation |
| +/−30 ns | Path regulation and timing |

In this example, the REC interface tolerance is a factory delay measurement tolerance between the BFN@TRP to the REC's CPRI port, the RE interface tolerance is the factory delay measurement tolerance between the RE's CPRI port and the RE's ARP, the path delay compensation tolerance is the base station's end-to-end delay compensation tolerance for each cascaded path between a REC and the destination RE, and the path regulation and timing tolerance is the maximum allowable variation in timing compensation due to jitter on the CPRI interfaces between a RCE and a particular RE over cascaded paths.

In some implementations, the nodal topology of a base station can be quite complex. For example, the base station may include multiple RECs and multiple REs connected in a cascaded arrangement, star arrangement, or some other arrangement. Depending on the arrangement, time alignment errors build up across sections of the uplink/downlink path. For example, in a cascaded arrangement, the time alignment errors of the RECs and REs build up along the sections of the uplink/downlink path between the nodes in the uplink/downlink path because each section in the overall path between the REC and the RE has its own measurement tolerances. This build-up of time alignment errors along the uplink/downlink path limits the number of RECs and REs that can be cascaded. Further, determining the delays between different RECs and REs in a complex topology is difficult and time consuming (e.g., a large amount of delay calibration data must be stored in non-volatile memory). Also, using the conventional approach, the REC and the RE must be re-calibrated after factory repair. Another issue is that REC and RE component aging and temperature delay compensation is measured only for a small representative sample of devices. The systems and methods described below may be used to measure end-to-end path delay (uplink and/or downlink) including the internal RE delays, and the systems and methods described above may be further used to fine tune delay adjustments at the RE. For example, the RE may advance the baseband data on the uplink based on the end-to-end uplink path delay measurement and also provide an additional fine delay adjustment using the systems and methods described above.

Figure 6:
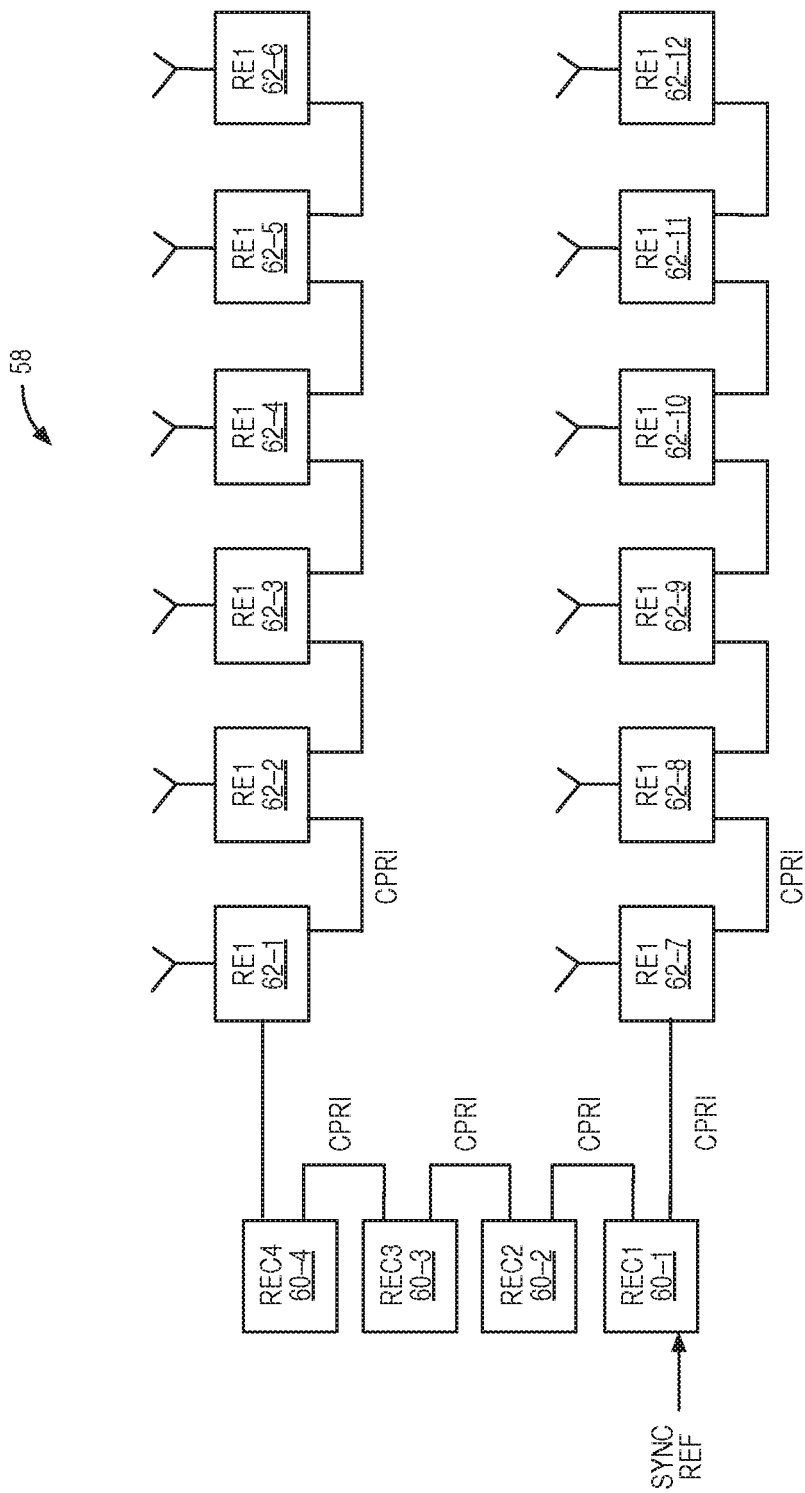
FIG. 6 illustrates a base station according to another embodiment of the present disclosure.

While these systems and methods described herein can be used for any nodal topology of the base station, they are particularly beneficial for complex nodal topologies such as, for example, a cascade topology where the base station includes multiple RECs and multiple REs connected in a cascade arrangement. One example of a base station 58 including multiple RECs 60-1 through 60-4 and multiple REs 62-1 through 62-12 connected in a cascade arrangement is illustrated in FIG. 6. The RECs 60-1 through 60-4 are generally referred to herein collectively as RECs 60 and individually as REC 60. Likewise, the REs 62-1 through 62-12 are generally referred to herein collectively as REs 62 and individually as RE 62. The RECs 60 and the REs 62 are connected via cables (e.g., optical cables) and communicate according to, in the exemplary embodiments described herein, the CPRI protocol.

In this cascade arrangement, the end-to-end uplink and downlink path delays between each REC 60 and each RE 62 are needed in order to provide proper time alignment of uplink and downlink radio frames. As discussed below in detail, in order to measure the end-to-end uplink path delay between, for example, the RE 62-3 and the REC 60-1, the RE 62-3 upconverts a low frequency chirped sine wave signal to the appropriate RF interface of the RE 62-3. The upconverted chirped sine wave signal is then passed through the RF interface of the RE 62-3 such that the chirped sine wave signal is recovered at baseband and then sent to the REC 60-1 via a CPRI interface of the RE 62-3 as In-phase and Quadrature (IQ) data. The REC 60-1 cross correlates a signal received from the RE 62-3 including the chirped sine wave signal and a reference chirped sine wave signal. Based on the results of the correlation, a phase shift or difference between the two chirped sine wave signals is determined. This phase shift is converted into a time delay, which is the end-to-end uplink path delay between the RE 62-3 and the REC 60-1.

In order to measure the end-to-end downlink path delay between, for example, the REC 60-1 and the RE 62-3, the REC 60-1 injects a low frequency chirped sine wave signal into a CPRI interface of the REC 60-1 for transmission to the RE 62-3. The RE 62-3 receives a signal including the chirped sine wave signal from the REC 60-1 via its CPRI interface and passes the received signal through the RF interface of the RE 62-3 to provide an RF output signal at an RF transmit port of the RF interface. The RE 62-3 samples an RF output signal at the RF transmit port of the RE 62-3 using, e.g., an RF diode. The RE 62-3 cross correlates the samples of the RF output signal with a reference chirped sine wave signal either at RF or at baseband. A phase shift, or difference, between the two chirped sine wave signals is determined based on the results of the correlation. This phase shift is converted into a time delay, which is the downlink processing delay between the REC 60-1 and the RE 62-3.

The end-to-end uplink and downlink path delays between each REC 60 and each RE 62 can be measured in the same manner. The measurements may be made, for example, when a CPRI link to an RE 62 becomes operational and/or when an REC 60 activates a carrier for an RE 62. This measurement scheme enables measurement of the end-to-end uplink and downlink path, or processing, delays for the current operating temperature, carrier frequency, and component age. This enables an REC 60 to apply delay compensation on the downlink path to the ARP of an RE 62 and to provide the RE 62 with at least part of the uplink path delay information that the RE 62 uses to compute uplink delay compensation data correction.

Note that the RE 62 may still use one of the embodiments described above to measure and compensate for its own in-equipment uplink and downlink delays and to compute the delay adjustment that the RE 62 applies on the uplink. On the uplink path the RE 62 advances the baseband data based on the internal processing delay of the RE 62 (measured using, for example one of the embodiments described above with respect to FIGS. 1-5B) and the end-to-end uplink path delay measured using one of the embodiments described with respect to FIGS. 6-10). In this manner, the REC 60 can precisely compute the end-to-end uplink delay which does include the uplink processing delay of the RE 62. The RE 60 can then compensate fine delay for the uplink path. The same can be done for the downlink, where fine compensation of the internal radio processing delay of the RE 62 can be performed using, for example, one of the embodiments described above with respect to FIGS. 1-5B and the end-to-end downlink path delay can be measured using one of the embodiments of FIGS. 6-10.

Figure 7:
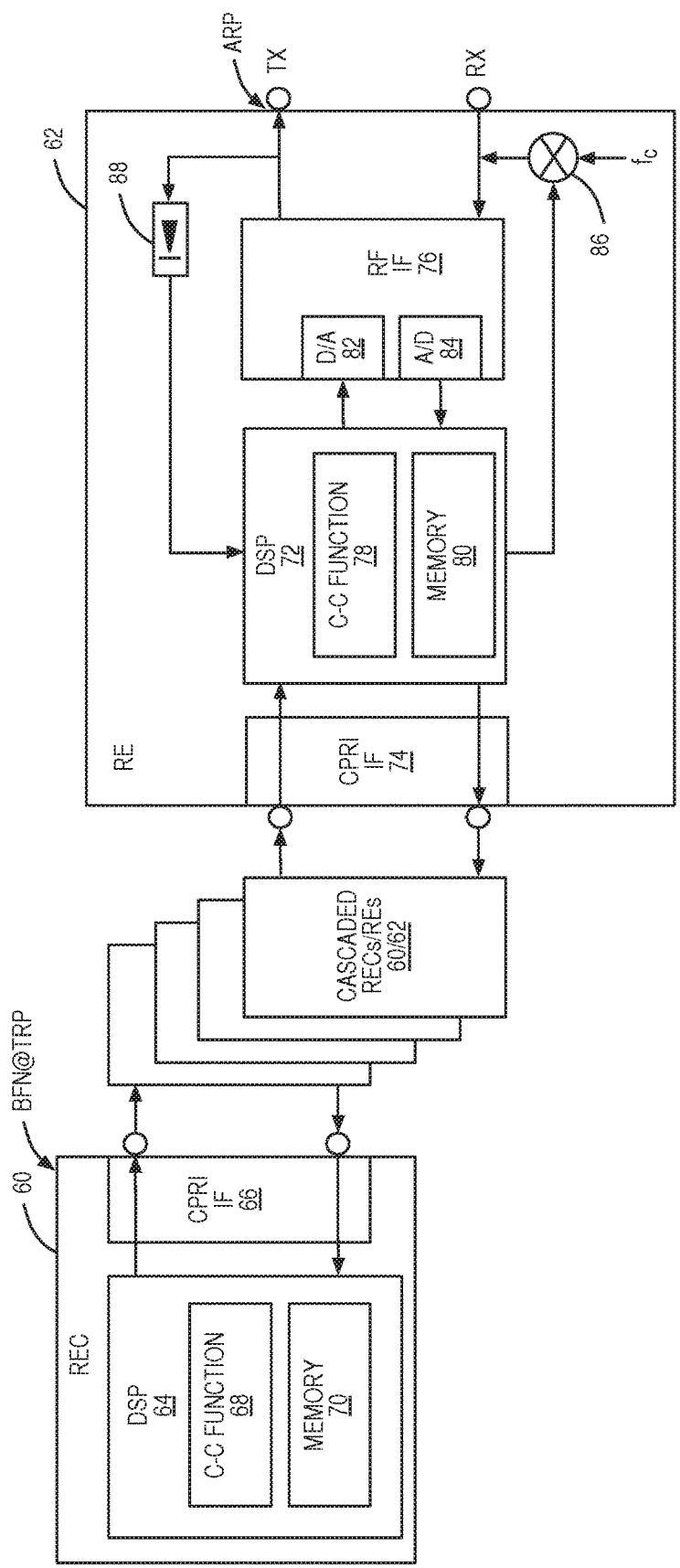
FIG. 7 illustrates one of the RECs and one of the REs of FIG. 6 in more detail according to one embodiment of the present disclosure.

FIG. 7 is a block diagram of one of the RECs 60 and one of the REs 62 according to one embodiment of the present disclosure. In this example, the REC 60 and the RE 62 are connected through one or more cascaded RECs 60 and/or REs 62. However, the present disclosure is not limited thereto. For example, the REC 60 and the RE 62 may alternatively be directly connected (e.g., in a star topology). As illustrated, the REC 60 includes a DSP 64 and a CPRI interface 66. In this embodiment, the DSP 64 includes a Cross-Correlation (C-C) function 68 and memory 70. The RE 62 includes a DSP 72, a CPRI interface 74, and an RF interface 76. The DSP 72 includes a cross-correlation function 78 and memory 80. The RF interface 76 includes a D/A converter 82 and an A/D converter 84. While not illustrated, the RF interface 76 further includes analog transmitter and analog receiver components (e.g., mixers, filters, amplifiers, etc.). The RE 62 also includes a mixer 86 (e.g., a diode mixer) and an RF diode 88 (e.g., a microwave RF diode).

Figure 8A:
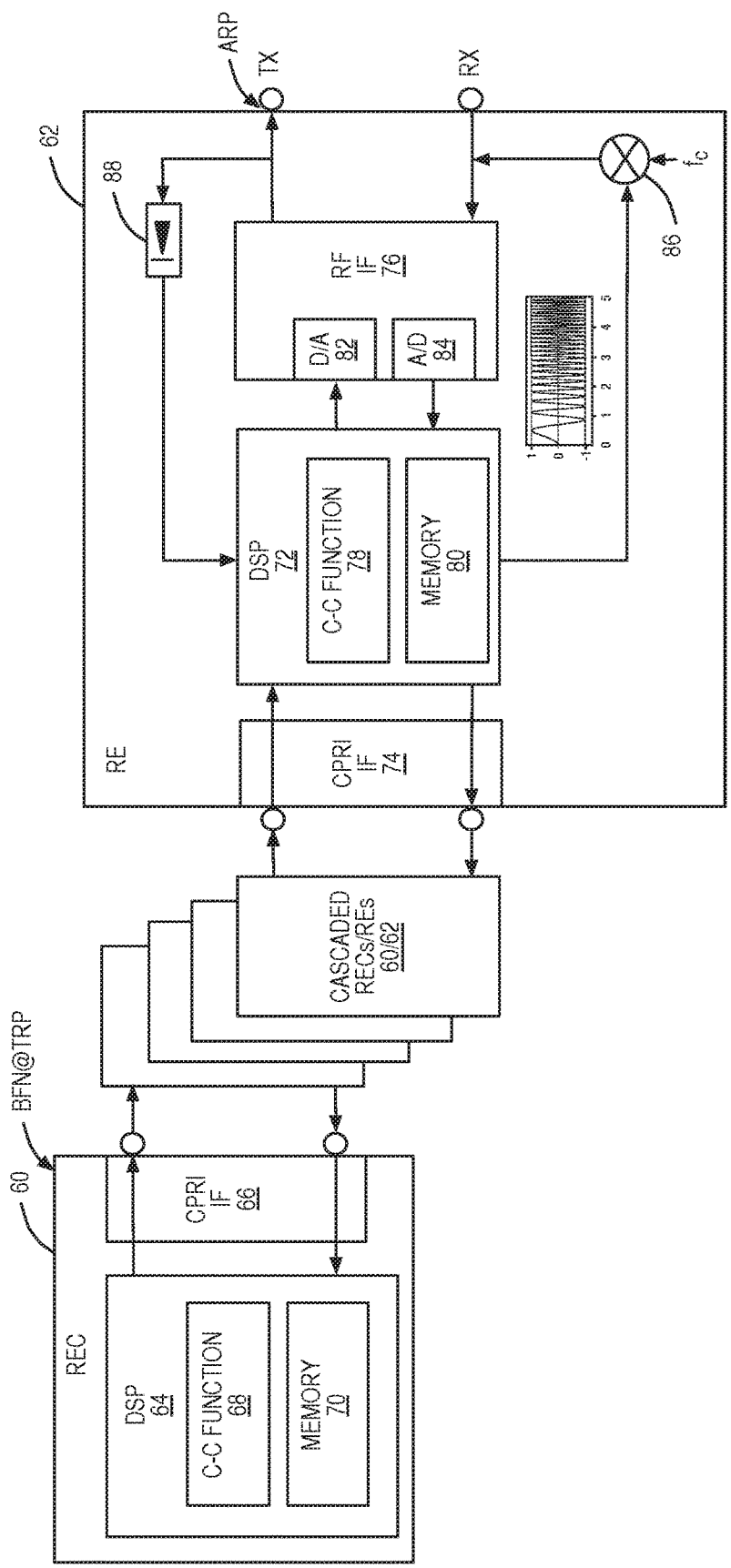
FIG. 8A illustrates the operation of the REC and the RE of FIG. 7 to measure the end-to-end uplink path delay according to one embodiment of the present disclosure.
Figure 8B:
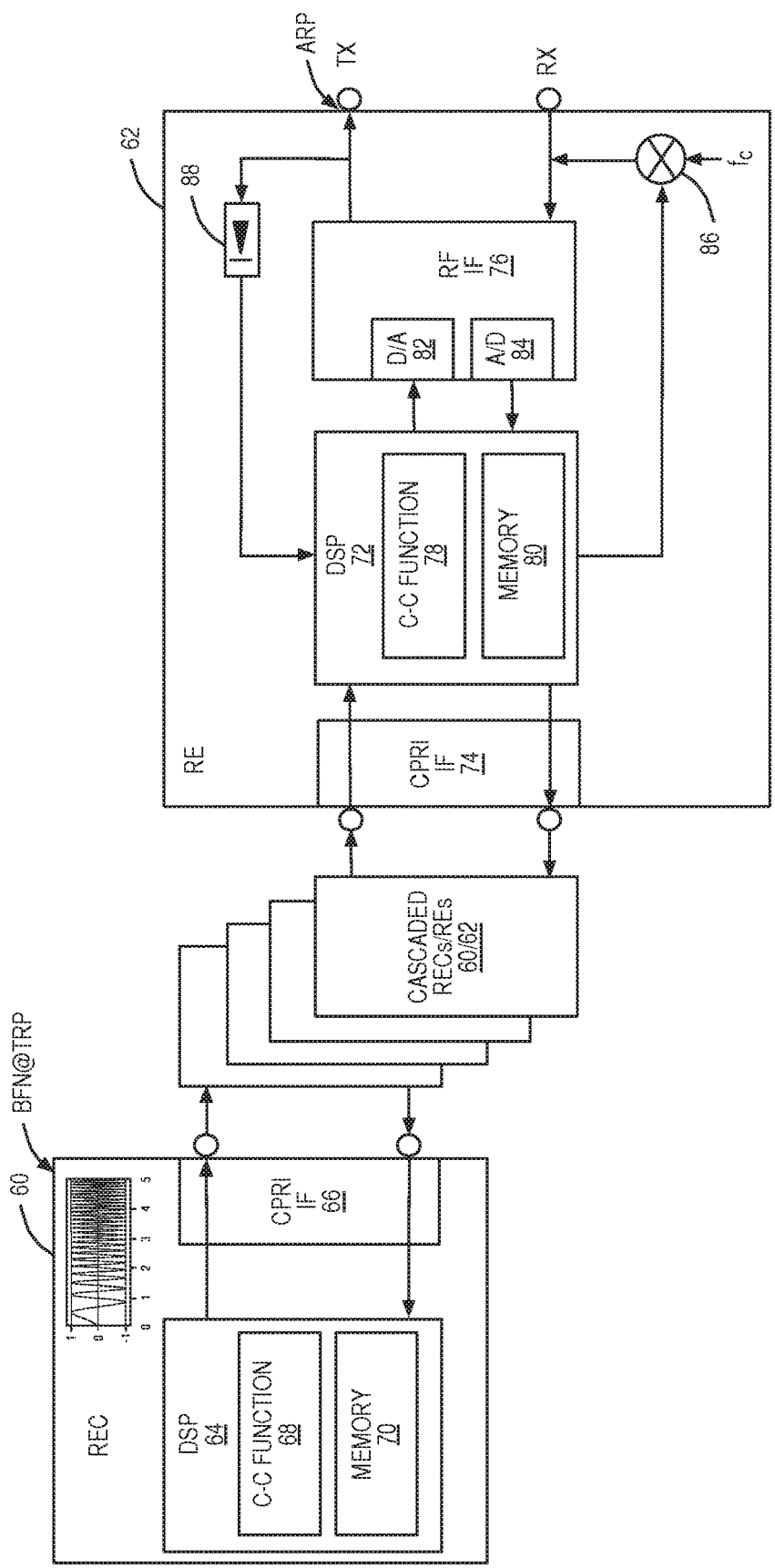
FIG. 8B illustrates the operation of the REC and the RE of FIG. 7 to measure the end-to-end downlink path delay according to one embodiment of the present disclosure.

The operation of the REC 60 and the RE 62 of FIG. 7 to provide measurements of the uplink and downlink path delays is illustrated in FIGS. 8A and 8B, respectively. In particular, FIG. 8A illustrates the operation of the REC 60 and the RE 62 to measure the uplink path delay between the RE 62 and the REC 60. As illustrated, the DSP 72 provides a low frequency chirped sine wave signal to the mixer 86. At the mixer 86, the chirped sine wave signal is upconverted to a desired carrier frequency ($f_c$). The resulting upconverted chirped sine wave signal is then injected into the RF receive port of the RF interface 76. The upconverted chirped sine wave signal passes through a receive path of the RF interface 76 (e.g., amplification, downconversion, filtering, etc.) such that samples of the chirped sine wave signal are recovered and output by the A/D converter 84 of the RF interface 76. At this point, the chirped sine wave signal has experienced a processing delay from the RF receive port to the output port of the RF interface 76. The samples of the chirped sine wave signal are then transmitted to the REC 60 via the CPRI interface 74 of the RE 62 in a CPRI frame. At the REC 60, the cross-correlation function 68 of the DSP 64 cross-correlates the signal received from the RE 62 in the CPRI frame (which includes the chirped sine wave signal) and a reference chirped sine wave signal (e.g., stored in the memory 70) to thereby determine a phase difference between the chirped sine wave signal received from the RE 62 and the reference chirped sine wave signal. This phase difference is then converted to a time delay, and this time delay is the end-to-end uplink path delay from the receive port of the RE 62 (i.e., the ARP of the RE 62) to the REC 60 (specifically the BFN@TRP of the RE 60).

FIG. 8B illustrates the operation of the REC 60 and the RE 62 to measure the downlink path delay between the REC 60 and the RE 62. As illustrated, the DSP 64 of the REC 60 injects a chirped sine wave signal into the CPRI interface 66 to be transmitted to the RE 62. At the RE 62, a signal including the chirped sine wave signal is received from the REC 60 via the CPRI interface 74 of the RE 62. The DSP 72 passes the signal to the input port of the RF interface 76 where the signal is D/A converted by the D/A converter 82 and then passed through a transmit path of the RF interface 76. The resulting RF output signal at the transmit port of the RF interface 76 is sampled by the RF diode 88. The samples of the RF output signal are provided to the DSP 72 where the DSP 72 cross-correlates the samples of the RF output signal and a reference chirped sine wave signal (either at baseband or at RF). Based on the results of the correlation, a phase shift between the two chirped sine wave signals is determined. This phase difference is then converted to a time delay, where this time delay is the end-to-end downlink path delay from the REC 60 (specifically the BFN@TRP of the REC 60) to the transmit port of the RE 62 (specifically the ARP of the RE 62). Notably, in one embodiment, the RE 62 determines the end-to-end downlink path delay and returns this delay to the REC 60 via the CPRI interface 74. In another embodiment, the RE 62 returns results of the cross-correlation or the phase difference to the REC 60 via the CPRI interface 74, where the REC 60 then uses this information to determine the end-to-end downlink path delay.

Figure 9:
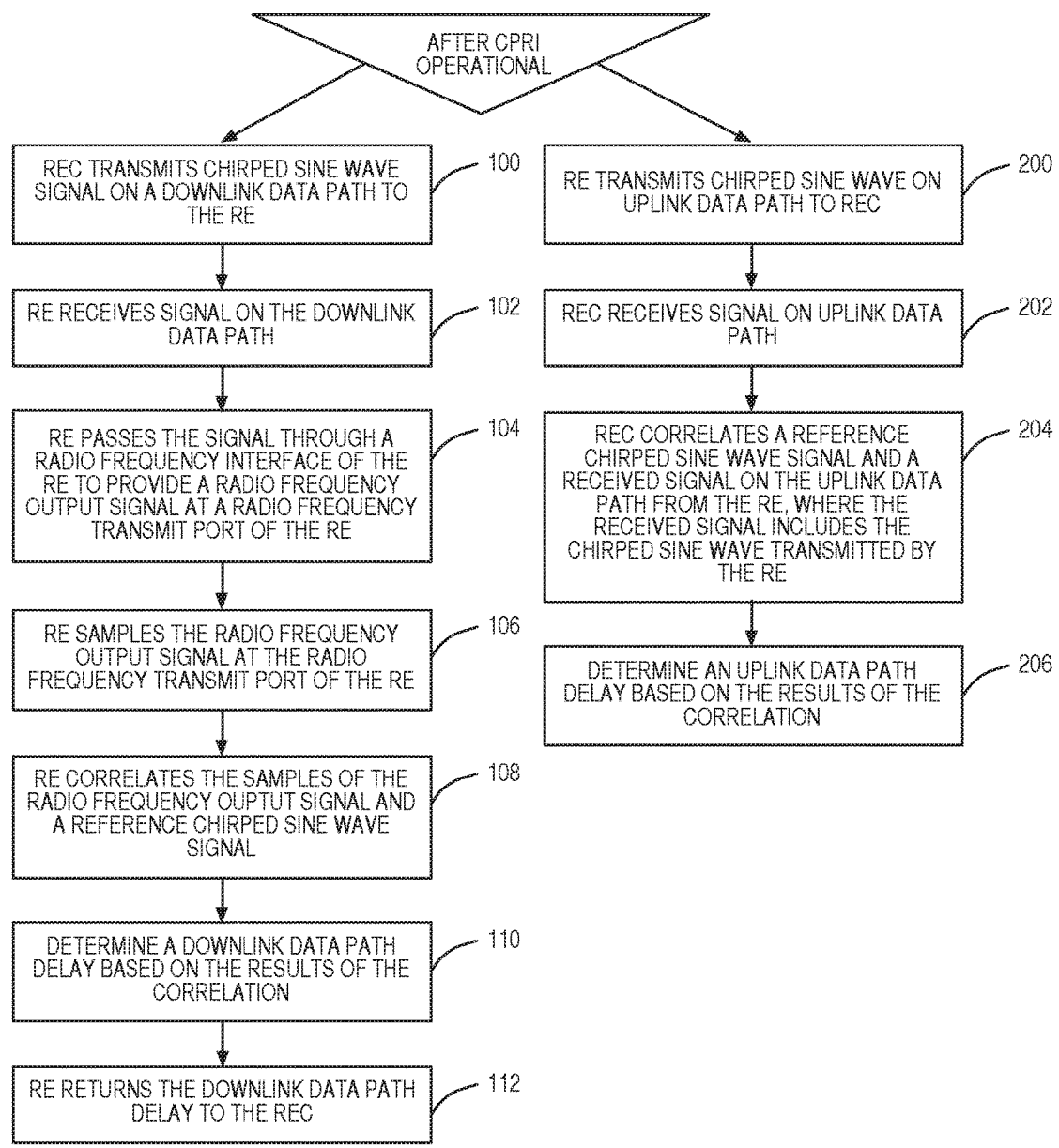
FIG. 9 is a flow chart that illustrates the operation of an REC and an RE to measure end-to-end uplink and downlink path delays according to one embodiment of the present disclosure.

FIG. 9 is a flow chart that illustrates the operation of the REC 60 and the RE 62 to obtain end-to-end uplink and downlink delay measurements according to one embodiment of the present disclosure. In this embodiment, the measurements are made when a CPRI link between the REC 60 and the RE 62 becomes operational (i.e., in response to a CPRI link between the REC 60 and the RE 62 becoming operational). For the end-to-end downlink path delay measurement, the REC 60 transmits a chirped sine wave signal over a downlink data path to the RE 62 (step 100). More specifically, in one embodiment, the REC 60 activates a carrier at a mid-band center frequency for the RE 62 and sets a power output to a minimum value. The REC 60 then injects the chirped sine wave signal onto a CPRI link from the REC 60 to the RE 62 with a sampling rate corresponding to, in one embodiment, a maximum channel bandwidth over the CPRI link.

The RE 62 receives a signal from the REC 60 on the downlink data path (step 102). More specifically, the RE 62 receives a signal from the REC 60 over the CPRI link, where the signal includes the chirped sine wave signal. The RE 62 passes the signal received from the REC 60 through the RF interface 76 to provide an RF output signal at the RF transmit port of the RE 62 (step 104). The RE 62 samples the RF output signal at the RF transmit port (step 106). In one embodiment, the RE 62 samples the RMS power of the RF output signal via the RF diode 88. In one embodiment, the sampling rate is two times the maximum channel rate. The RF output signal is sampled for an appropriate amount of time. In one embodiment, the RF output signal is sampled for 10 ms. The RE 62, and in particular the cross-correlation function 78, correlates the samples of the RF output signal and a reference chirped sine wave signal (step 108). In this embodiment, the RE 62 then determines the end-to-end downlink path delay based on results of the correlation and returns the end-to-end downlink path delay to the REC 60 over the CPRI link (steps 110 and 112). Note, however, that in an alternative embodiment, the RE 62 returns the results of the correlation or a phase difference determined based on the results of the correlation to the REC 60, where the REC 60 then uses this information to determine the end-to-end downlink delay.

For the end-to-end uplink path delay, the RE 62 transmits a chirped sine wave signal over an uplink data path from the RE 62 to the REC 60 (step 200). More specifically, in one embodiment, the REC 60 activates a radio uplink channel at a mid-band center frequency. The RE 62 uses the mixer 86 to mix the chirped sine wave signal (e.g., a 92.12 MHz chirped sine wave signal) with the receive carrier frequency ($f_c$) to provide an upconverted, or RF, chirped sine wave signal. The RE 62 injects the upconverted chirped sine wave signal into the RF receive port of the RE 62 (i.e., the RF receive port of the RF interface 76 of the RE 62). Using the A/D converter 84, the RE 62 samples the resulting baseband received signal. The RE 62 then transmits the received baseband signal to the REC 60 over the CPRI link. In one embodiment, the RE 62 sends a 10 ms segment of the received baseband signal that includes the chirped sine wave signal. The REC receives the signal on the uplink data path (step 202). The REC 60 correlates the received signal from the RE 62 with a reference chirped sine wave signal (step 204). The REC 60 then determines the end-to-end uplink path delay based on results of the correlation (step 206). More specifically, in one embodiment, the REC 60 determines a phase shift between the two chirped sine wave signals based on the results of the correlation and then converts the phase shift, or phase difference, to a time delay. This time delay is the end-to-end uplink path delay from the ARP of the RE 62 and the BFN@TRP of the REC 60.

Figure 10:
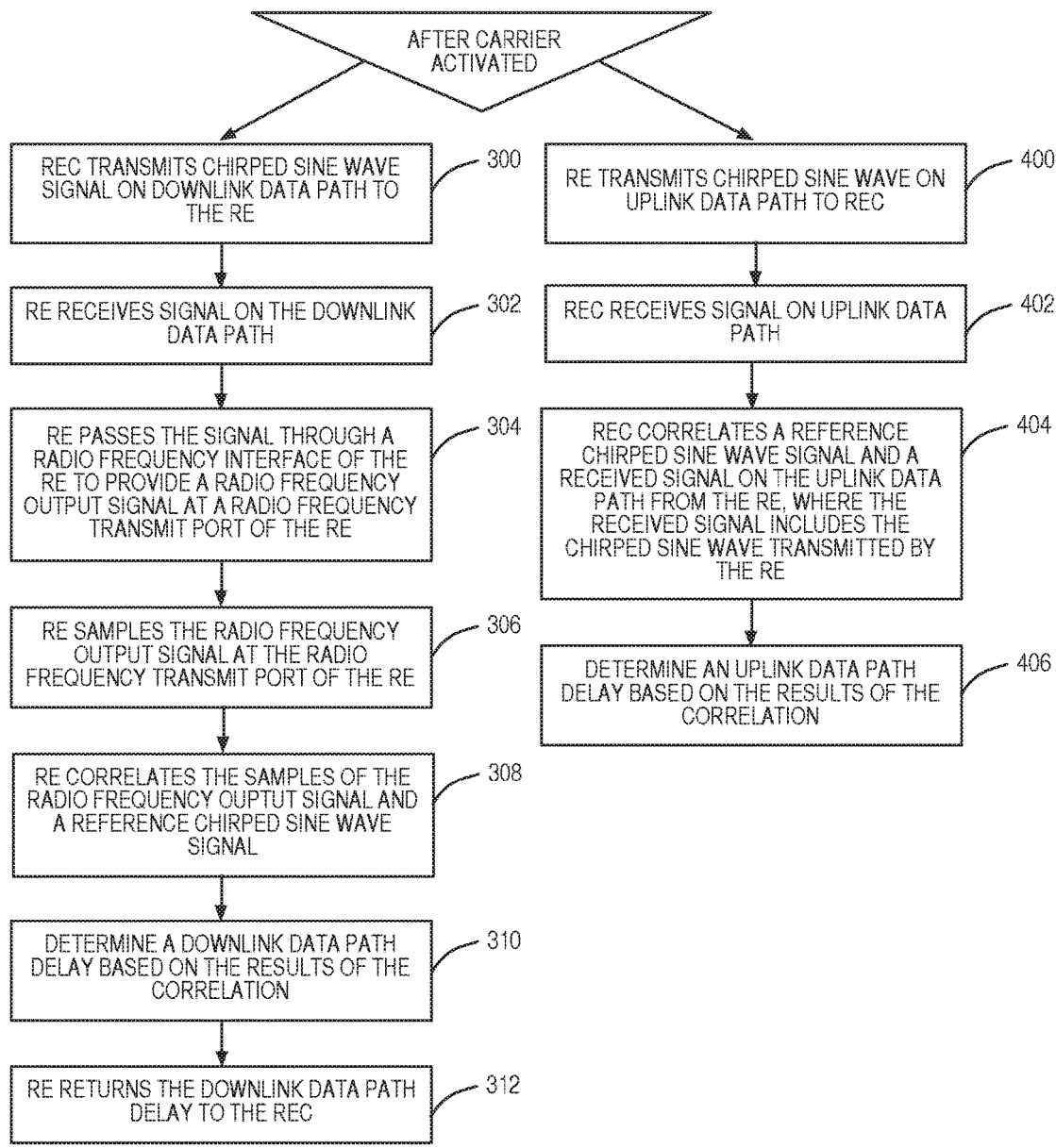
FIG. 10 is a flow chart that illustrates the operation of an REC and an RE to measure end-to-end uplink and downlink path delays according to another embodiment of the present disclosure.

FIG. 10 is a flow chart that illustrates the operation of the REC 60 and the RE 62 to obtain end-to-end uplink and downlink delay measurements according to another embodiment of the present disclosure. In this embodiment, the measurements are made when the REC 60 activates a carrier in the RE 62 (i.e., in response to the REC 60 activating a carrier in the RE 62). For the end-to-end downlink path delay measurement, the REC 60 transmits a chirped sine wave signal over a downlink data path to the RE 62 (step 300). More specifically, in one embodiment, the REC 60 activates the carrier at the RE 62 and sets a power output to a minimum value. The REC 60 then injects the chirped sine wave signal onto a CPRI link from the REC 60 to the RE 62 with a sampling rate corresponding to, in one embodiment, a maximum channel bandwidth over the CPRI link.

The RE 62 receives a signal from the REC 60 on the downlink data path (step 302). More specifically, the RE 62 receives a signal from the REC 60 over the CPRI link, where the signal includes the chirped sine wave signal. The RE 62 passes the signal received from the REC 60 through the RF interface 76 to provide an RF output signal at the RF transmit port of the RE 62 (step 304). The RE 62 samples the RF output signal at the RF transmit port (step 306). In one embodiment, the RE 62 samples the RMS power of the RF output signal via the RF diode 88. In one embodiment, the sampling rate is two times the maximum channel rate. The RF output signal is sampled for an appropriate amount of time. In one embodiment, the RF output signal is sampled for 10 ms. The RE 62, and in particular the cross-correlation function 78, correlates the samples of the RF output signal and a reference chirped sine wave signal (step 308). In this embodiment, the RE 62 then determines the end-to-end downlink path delay based on results of the correlation and returns the end-to-end downlink path delay to the REC 60 over the CPRI link (steps 310 and 312). Note, however, that in an alternative embodiment, the RE 62 returns the results of the correlation or a phase difference determined based on the results of the correlation to the REC 60, where the REC 60 then uses this information to determine the end-to-end downlink delay.

For the end-to-end uplink path delay, the RE 62 transmits a chirped sine wave signal over an uplink data path from the RE 62 to the REC 60 (step 400). More specifically, in one embodiment, the REC 60 activates the radio uplink channel at the carrier frequency. The RE 62 uses the mixer 86 to mix the chirped sine wave signal (e.g., a 92.12 MHz chirped sine wave signal) with the receive carrier frequency ($f_c$) to provide an upconverted, or RF, chirped sine wave signal. The RE 62 injects the upconverted chirped sine wave signal into the RF receive port of the RE 62 (i.e., the RF receive port of the RF interface 76 of the RE 62). Using the A/D converter 84, the RE 62 samples the resulting baseband received signal. The RE 62 then transmits the received baseband signal to the REC 60 over the CPRI link. In one embodiment, the RE 62 sends a 10 ms segment of the received baseband signal that includes the chirped sine wave signal. The REC receives the signal on the uplink data path (step 402). The REC 60 correlates the received signal from the RE 62 with a reference chirped sine wave signal (step 404). The REC 60 then determines the end-to-end uplink path delay based on results of the correlation (step 406). More specifically, in one embodiment, the REC 60 determines a phase shift between the two chirped sine wave signals based on the results of the correlation and then converts the phase shift, or phase difference, to a time delay. This time delay is the end-to-end uplink path delay from the ARP of the RE 62 and the BFN@TRP of the REC 60.

The measurement techniques described above provide an automated process by which the base station 58 measures end-to-end uplink and/or downlink path delay to an accuracy of, for example, +/−20 ns. The disclosed measurement techniques can be used regardless of the topology of the base station 58. For instance, the measurement techniques disclosed herein can be used if the base station 58 has a cascaded REC or RE topology, a star REC or RE topology, or any other suitable topology. As there is a single measurement across the uplink or downlink end-to-end paths there is no build up in tolerance errors when each section of the uplink/downlink path is measured separately and there is no need for factory pre-calibration of delay parameters. Further, the need to store component age and operating frequency and temperature calibration data in the REC 60 is avoided. The measured processing delay information would be for current operating temperature, component age of devices over the links, and the carrier frequency. This is not possible with the current state of the art which requires factory calibration and storage of typical component age and frequency and temperature compensation data on the base station and the RE. Also, when there are cellular network timing issues, technicians can use the uplink and downlink path delay measurements to determine root cause of timing failures. As this data has been measured by the base station 58 for the current operating conditions, the technician does not have to repeat these measurements in the field.

In the embodiments discussed above, the RE 62 is directly connected to the REC 60 over dedicated connections such as synchronous CPRI links. These links are point-to-point and can either be electrical or fiber optic cables. These point-to-point links ensure that timing can be precisely maintained in order to maximize coverage and minimize inter-cell interference.

Additionally, in many embodiments, the REC 60 must be operated inside an environmentally controlled storage enclosure. The cellular base station cabinets may be expensive to operate, and in many instances, the network operator has to rent space for the cabinet. Both the CPRI links and the equipment cabinets may be major sources of expenses to the network operator. Due to the point-to-point links, the REC 60 must be located within a radius of about 40 kilometers of the REs 62 controlled by the REC 60 to provide correct time alignment. The network operator will also have to service the RECs 60 located at remote sites.

As discussed above, timing must be aligned between the REC 60 and the REs 62 such that the first sample of DL radio frame is being transmitted into the air, i.e. reaching the ARP, at the transmit reference point (BFN@TRP) of the REC 60. On the UL, the first sample of the UL radio frame is the one received at the ARP at BFN@TRP. According to some embodiments, the allowed timing error tolerance in the node is summarized below in Table 1:

TABLE 1

| Tolerance | Node element |
|---|---|
| +/−10 nsec | REG interface |
| +/−15 nsec | RE interface |
| +/−35 nsec | Path delay compensation |
| +/−30 nsec | Path regulation and timing |

Figure 11A:
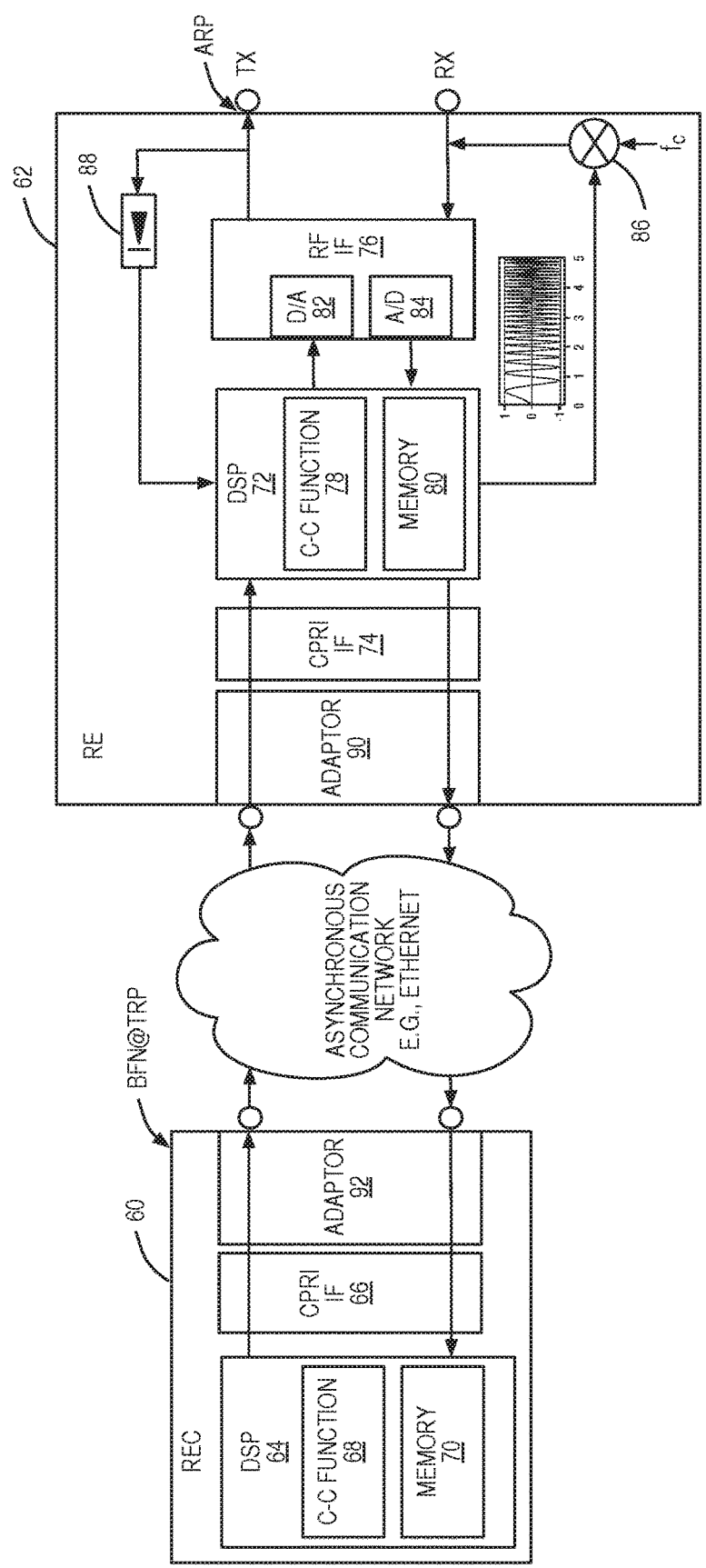
FIG. 11A illustrates the operation of an REC and an RE connected via an asynchronous communication network to measure the end-to-end uplink path delay according to one embodiment of the present disclosure.

To address these issues, FIG. 11A illustrates the operation of an REC 60 and an RE 62 connected via an asynchronous communication network to measure the end-to-end uplink path delay according to one embodiment of the present disclosure. According to some embodiments, the use of an asynchronous communication network permits the RECs 60 to be centrally located in a network-based server farm. The REs 62 would be connected to an REC 60 via the asynchronous communication network. In some embodiments the asynchronous communication network is an Ethernet network. Further, in some embodiments, the RECs 60 and REs 62 communicate via Gigabit Ethernet links. There is no need for the connections to be point-to-point, as the RE synchronizes the internal clocks with the Gigabit links and measures the radio frame timing from the data packets received from the base stations according to the embodiments discussed above. Some ways to enable communication between the REC 60 and RE 62 are discussed in U.S. patent application Ser. No. 13/278,212, entitled "METHODS AND APPARATUSES FOR MAINTAINING SYNCHRONIZATION BETWEEN A RADIO EQUIPMENT CONTROLLER AND AN ITEM OF RADIO EQUIPMENT," now U.S. Pat. No. 8,599,827 B2, issued Dec. 3, 2013. Specifically, the REC 60 measures the transit delay between the base station's CPRI transmit reference point (BFN@TRP) and the ARP of RE 62. The downlink and uplink delays are measured separately using one correlation measurement for downlink and one for uplink. The REC 60 uses this delay measurement data to compute the delay compensation it applies to the downlink path and the data it must provide to the RE 62 for it to apply uplink delay compensation.

In particular, FIG. 11A illustrates the operation of the REC 60 and the RE 62 to measure the uplink path delay between the RE 62 and the REC 60. As illustrated, the DSP 72 provides a low frequency chirped sine wave signal to the mixer 86. At the mixer 86, the chirped sine wave signal is upconverted to a desired carrier frequency ($f_c$). The resulting upconverted chirped sine wave signal is then injected into the RF receive port of the RF interface 76. The upconverted chirped sine wave signal passes through a receive path of the RF interface 76 (e.g., amplification, downconversion, filtering, etc.) such that samples of the chirped sine wave signal are recovered and output by the A/D converter 84 of the RF interface 76. At this point, the chirped sine wave signal has experienced a processing delay from the RF receive port to the output port of the RF interface 76. The samples of the chirped sine wave signal are then transmitted to the REC 60 via the asynchronous communication network. This is illustrated in FIG. 11A as a CPRI interface 74 of the RE 62 being connected to an adaptor 90. In other embodiments, the adaptor 90 may be an external component not included within the RE 62. Also, in some embodiments, the adaptor 90 and the CPRI interface 74 of the RE 62 may instead be a single communication interface operable to communicate via the asynchronous communication network. At the REC 60, the cross-correlation function 68 of the DSP 64 cross-correlates the signal received from the RE 62 via the adaptor 92 connected to the CPRI interface 66 of REC 60 (which includes the chirped sine wave signal) and a reference chirped sine wave signal (e.g., stored in the memory 70) to thereby determine a phase difference between the chirped sine wave signal received from the RE 62 and the reference chirped sine wave signal. This phase difference is then converted to a time delay, and this time delay is the end-to-end uplink path delay from the receive port of the RE 62 (i.e., the ARP of the RE 62) to the REC 60 (specifically the BFN@TRP of the RE 60).

Figure 11B:
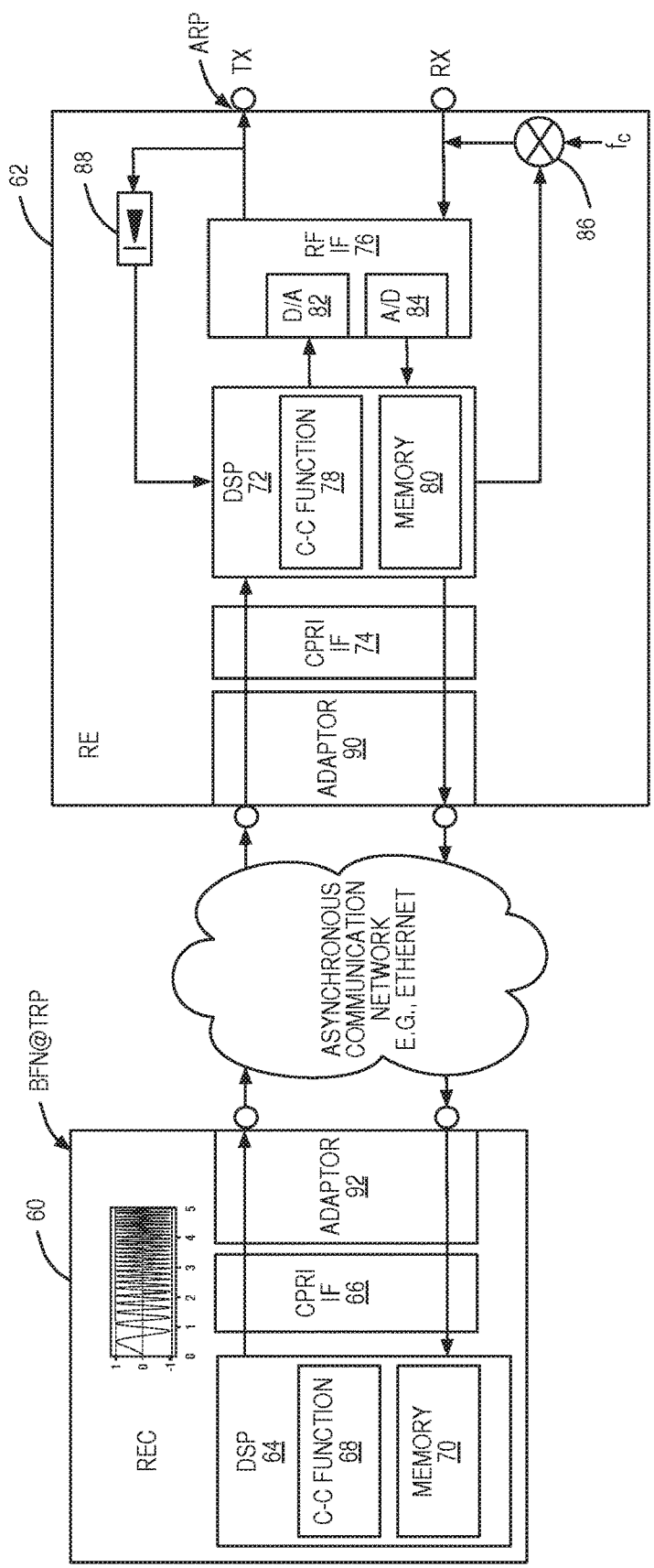
FIG. 11B illustrates the operation of the REC and the RE of FIG. 11A to measure the end-to-end downlink path delay according to one embodiment of the present disclosure.

FIG. 11B illustrates the operation of the REC 60 and the RE 62 to measure the downlink path delay between the REC 60 and the RE 62. As illustrated, the DSP 64 of the REC 60 injects a chirped sine wave signal into the CPRI interface 66 to be transmitted to the RE 62 via the adaptor 92. In other embodiments, the adaptor 92 may be an external component not included within the REC 60. Also, in some embodiments, the adaptor 92 and the CPRI interface 66 of the REC 60 may instead be a single communication interface operable to communicate via the asynchronous communication network. At the RE 62, a signal including the chirped sine wave signal is received from the REC 60 via the asynchronous communication network. The DSP 72 passes the signal to the input port of the RF interface 76 where the signal is D/A converted by the D/A converter 82 and then passed through a transmit path of the RF interface 76. The resulting RF output signal at the transmit port of the RF interface 76 is sampled by the RF diode 88. The samples of the RF output signal are provided to the DSP 72 where the DSP 72 cross-correlates the samples of the RF output signal and a reference chirped sine wave signal (either at baseband or at RF). Based on the results of the correlation, a phase shift between the two chirped sine wave signals is determined. This phase difference is then converted to a time delay, where this time delay is the end-to-end downlink path delay from the REC 60 (specifically the BFN@TRP of the REC 60) to the transmit port of the RE 62 (specifically the ARP of the RE 62). Notably, in one embodiment, the RE 62 determines the end-to-end downlink path delay and returns this delay to the REC 60 via the CPRI interface 74. In another embodiment, the RE 62 returns results of the cross-correlation or the phase difference to the REC 60 where the REC 60 then uses this information to determine the end-to-end downlink path delay.

The embodiments of FIGS. 11A and 11B permit operation of the REs 62 without the need for direct point-to-point synchronous connections to the REC 60. The REC 60 could therefore be operated up to a thousand kilometers from the REs 62 it is controlling, according to some embodiments. This permits an operator to support many radio nodes (such as REs 62) from a single server farm of RECs 60. In some embodiments, the asynchronous communication network is an Ethernet network. Also, in some embodiments the Ethernet network is encrypted or may include an Internet Protocol Security (IPsec) tunnel.

The digital base band signals from the REC 60 may be streamed to the REs 62 over Gigabit Ethernet links using a Virtual Private Network (VPN) to guarantee data integrity and security. According to some embodiments, the network operator may no longer need to provide as much support to cellular radio sites locally since the RECs 60 can all be operated in a central location for a region. The network operator may also realize savings by operating base stations from a common server farm versus remote sites because of the increased efficiency of asynchronous packet transmission versus synchronous frame based CPRI; reduced rental costs for locating base station equipment cabinets; reduced need to run power and environmental services to remote sites; reduced need to service the remote sites; and the reduced opportunity for vandalism and theft at remote sites.

Figure 12:
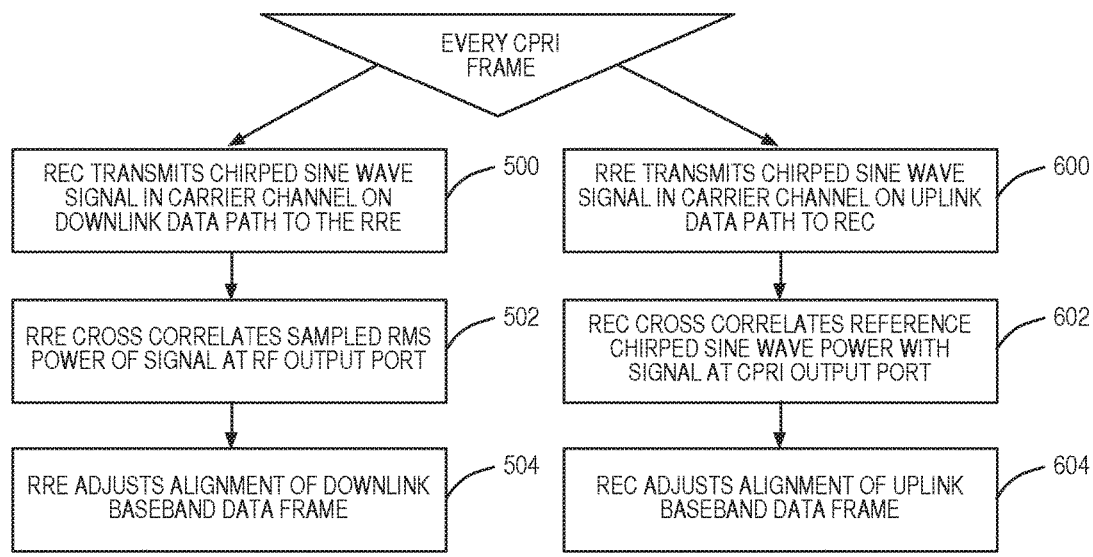
FIG. 12 is a flow chart that illustrates the operation of an REC and an RE to measure end-to-end uplink and downlink path delays every CPRI frame according to one embodiment of the present disclosure.

The delay over the asynchronous communication network may vary; therefore, the frame timing alignment should be continuously monitored and re-aligned for both downlink and uplink paths. In some embodiments, this realignment is performed once in a predetermined period such as once per radio frame. By making adjustments every radio frame (10 ms in some embodiments), the adjustments are kept small, which minimizes the need for large alignment buffers in memory. Light can travel approximately 2,000 kilometers over optical fiber within 10 ms. This limits the maximum fiber separation between the REC 60 and RE 62 to 1,000 kilometers if there is re-alignment every radio frame (10 ms). FIG. 12 is a flow chart that illustrates the operation of the REC 60 and the RE 62 to measure end-to-end uplink and downlink path delays every CPRI frame according to one embodiment of the present disclosure. Once per CPRI frame, the REC 60 transmits a chirped sine wave signal in the carrier channel on the downlink path to the RE 62 (step 500). The RE 62 cross correlates the sampled RMS power of the signal at the RF output port (step 502). The RE 62 then adjusts the alignment of the downlink baseband data frame (step 504). In some embodiments, the downlink path delay or the results of the cross correlation are sent back to the REC 60. Also once per CPRI frame, the RE 62 transmits a chirped sine wave signal in the carrier channel on the uplink data path to the REC 60 (step 600). The REC 60 cross correlates a reference chirped sine wave power with the signal at the CPRI output port (step 602). The REC 60 then adjusts the alignment of the uplink baseband data frame (step 604).

Figure 13:
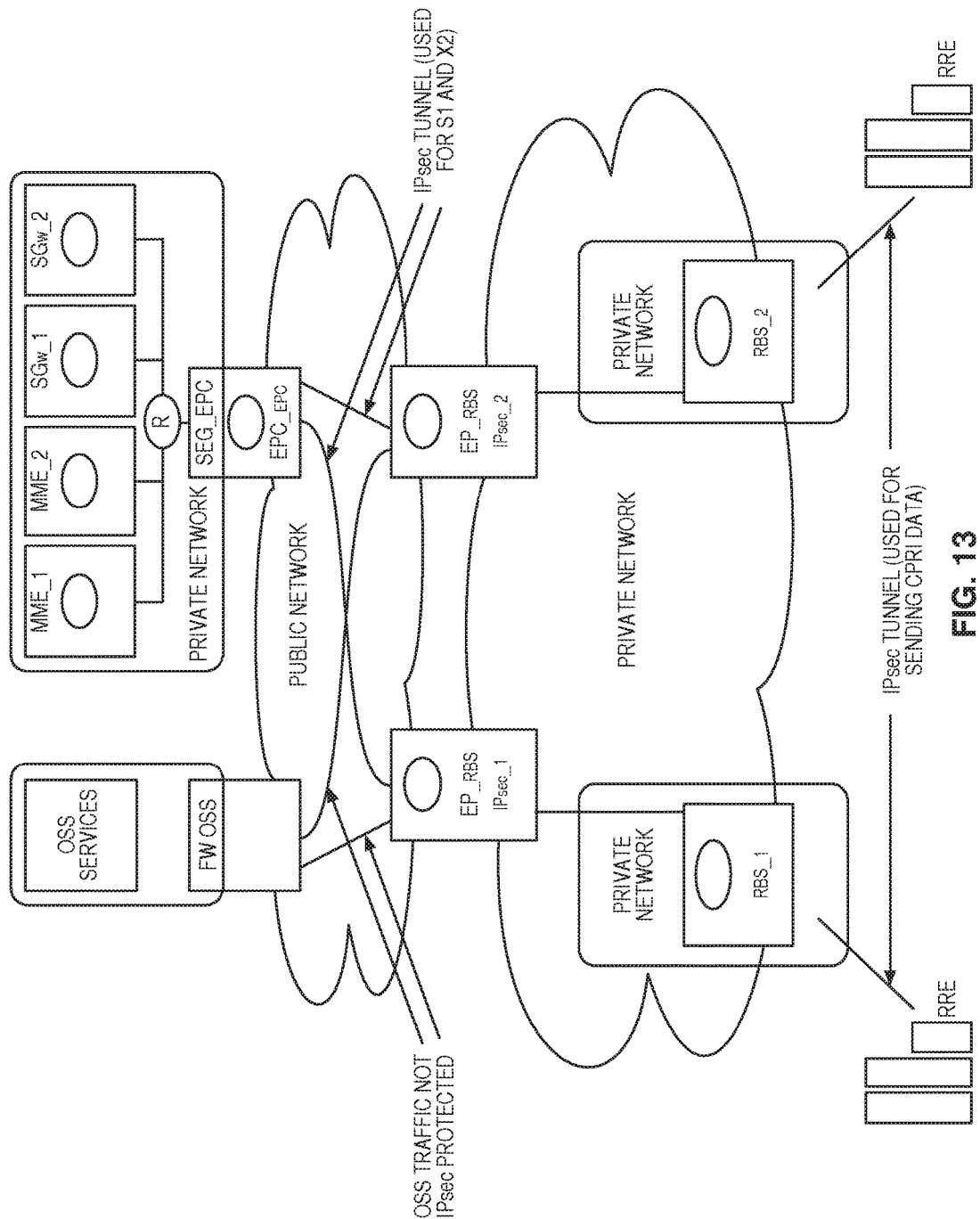
FIG. 13 illustrates a network diagram where the REC and RE of FIGS. 8A and 8B may be used according to one embodiment of the present disclosure.

The REC 60 and RE 62 of FIGS. 8A and 8B may be used in many ways to reduce the cost of operation or to improve service quality as discussed above. FIG. 13 illustrates a network diagram where the REC 60 and RE 62 of FIGS. 8A and 8B may be used according to one embodiment of the present disclosure. Specifically, FIG. 13 illustrates a wireless network in which the RECs 60 are located centrally in one or more Radio Base Station (RBS) such as the Enterprise RBS (EP_RBS), and the REs 62 are attached remotely as Remote Radio Equipment (RRE) over IPsec tunnels which carry the CPRI control and IQ data in Ethernet packets. IPsec supports network-level peer authentication, data origin authentication, data integrity, data confidentiality (encryption), and replay protection. In this embodiment, the IPsec tunnels are responsible for delivering the asynchronous packet flow comprising CPRI basic frames and overhead information. High Quality of Service (QoS) ensures that the asynchronous packet order is preserved and delay is minimized through data switches. FIG. 13 also shows IPsec tunnels being used to transport X2 communications between various RBSs. IPsec tunnels are also used for S1 communications between RBSs and nodes in the core network such as one or more Mobility Management Entities (MMEs) and one or more Serving Gateways (SGws). In contrast, the Operations Support System (OSS) services may not need to be protected with IPsec. FIG. 13 shows a mixture of public networks and private networks, but other embodiments may use only one or the other, or may use a different configuration of which connections are made using which type of network. For instance, the $MME_{-1}$, $MME_{-2}$, $SGw_{-1}$, and $SGw_{-2}$ are shown as being in a private network. That private network includes a router that interfaces with a Segregated Evolved Packet Core (SEG_EPC) which is in communication with a public Evolved Packet Core (EPC) labeled EPC_EPC which is part of a public network. Similarly, the OSS services are shown communicating with the public network via the Forward OSS (FW OSS).

The following acronyms are used throughout this disclosure.

A/D Analog-to-Digital
ARP Antenna Reference Point
BFN@TRP Basic Frame Transmit Reference Point
C-C Cross-Correlation
CPRI Common Public Radio Interface
D/A Digital-to-Analog
DL Downlink
DSP Digital Signal Processor
EPC Evolved Packet Core
EP_RBS Enterprise Radio Base Station
FDD Frequency Division Duplex
FW OSS Forward Operation Support System
IPsec Internet Protocol Security
IQ In-phase and Quadrature
kHz Kilohertz
MHz Megahertz
MME Mobility Management Entity
ms Millisecond
ns Nanosecond
OSS Operations Support System
QoS Quality of Service
RBS Radio Base Station
RE Radio Equipment
REC Radio Equipment Controller
RF Radio Frequency
RMS Root Mean Square
RRE Remote Radio Equipment
RX Receive Port
SEG_EPC Segregated Evolved Packet Core
SGw Serving Gateway
TDD Time Division Duplex
TX Transmit Port
UL Uplink
VPN Virtual Private Network Those skilled in the art will recognize improvements and modifications to the embodiments of the present disclosure. All such improvements and modifications are considered within the scope of the concepts disclosed herein and the claims that follow.

What is claimed is:

1. A system comprising:
   a Radio Equipment, RE, configured to transmit an uplink chirped sine wave signal from the RE to a Radio Equipment Controller, REC, on an uplink data path from the RE to the REC via an asynchronous communication network;
   the REC configured to:
      correlate a reference chirped sine wave signal and a received signal from the RE on the uplink data path via the asynchronous communication network, the received signal comprising the uplink chirped sine wave signal; and
      determine an uplink data path delay from the RE to the REC based on results of the correlation of the reference chirped sine wave signal and the received signal from the RE on the uplink data path; and
   the RE is further configured to:
      mix the uplink chirped sine wave signal and a predetermined uplink carrier frequency to provide an upconverted signal;
      inject the upconverted signal into a radio frequency receive port of the RE such that the upconverted signal passes through a radio frequency interface of the RE to provide samples of the uplink chirped sine wave signal at an output of the radio frequency interface; and
      transmit the samples of the uplink chirped sine wave signal on the uplink data path from the RE to the REC via the asynchronous communication network; and
   the REC is further configured to:
      receive a signal on the uplink data path via the asynchronous communication network comprising the samples of the uplink chirped sine wave signal transmitted from the RE to the REC on the uplink data path;
      correlate the samples of the received signal and the reference chirped sine wave signal; and
      determine the uplink data path delay from the RE to the REC based on results of the correlation of the samples of the received signal and the reference chirped sine wave signal.

2. The system of claim 1 wherein the uplink data path delay is a delay from the radio frequency receive port of the RE to a receive reference point in the REC.

3. The system of claim 1 wherein the uplink data path traverses one or more nodes between the RE and the REC in the asynchronous communication network.

4. The system of claim 1 wherein the RE is further configured to transmit the uplink chirped sine wave signal from the RE to the REC on the uplink data path from the RE to the REC via the asynchronous communication network and the REC is further configured to correlate the reference chirped sine wave signal and the received signal from the RE and determine the uplink data path delay from the RE to the REC once in a predetermined period.

5. The system of claim 4 wherein the predetermined period is a single radio frame.

6. The system of claim 1 wherein:
   the REC is further configured to transmit a downlink chirped sine wave signal from the REC to the RE on a downlink data path from the REC to the RE via the asynchronous communication network; and
   the RE is further configured to:
      receive a signal on the downlink data path from the REC to the RE via the asynchronous communication network, the signal comprising the downlink chirped sine wave signal transmitted by the REC on the downlink data path from the REC to the RE;
      pass the signal received on the downlink data path through the radio frequency interface of the RE to provide a radio frequency output signal at a radio frequency transmit port of the RE;
      sample the radio frequency output signal to provide samples of the radio frequency output signal; and
      correlate the samples of the radio frequency output signal and the reference chirped sine wave signal;
   wherein a downlink data path delay from the REC to the RE is determined based on results of the correlation of the samples of the radio frequency output signal and the reference chirped sine wave signal.

7. The system of claim 6 wherein the RE is further configured to determine the downlink data path delay from the REC to the RE based on the results of the correlation of the samples of the radio frequency output signal and the reference chirped sine wave signal.

8. The system of claim 6 wherein:
the RE is further configured to provide, to the REC, the results of the correlation of the samples of the radio frequency output signal and the reference chirped sine wave signal; and
the REC is further configured to determine the downlink data path delay from the REC to the RE based on the results of the correlation of the samples of the radio frequency output signal and the reference chirped sine wave signal.

9. The system of claim 6 wherein the downlink data path delay is a delay from a transmit reference point in the REC to the radio frequency transmit port of the RE.

10. The system of claim 6 wherein the downlink data path traverses one or more nodes between the RE and the REC in the asynchronous communication network.

11. The system of claim 6 wherein the REC is further configured to transmit the downlink chirped sine wave signal from the REC to the RE on the downlink data path from the REC to the RE and the RE is further configured to determine the downlink data path delay from the REC to the RE once in a predetermined period.

12. The system of claim 11 wherein the predetermined period is a single radio frame.

13. A system comprising:
a Radio Equipment Controller, REC, configured to transmit a downlink chirped sine wave signal from the REC to a Radio Equipment, RE, on a downlink data path from the REC to the RE via an asynchronous communication network; and
the RE configured to:
receive a signal on the downlink data path from the REC to the RE via the asynchronous communication network, the signal comprising the downlink chirped sine wave signal transmitted by the REC on the downlink data path from the REC to the RE;
pass the signal received on the downlink data path through a radio frequency interface of the RE to provide a radio frequency output signal at a radio frequency transmit port of the RE;
sample the radio frequency output signal to provide samples of the radio frequency output signal;
correlate the samples of the radio frequency output signal and a reference chirped sine wave signal;
mix an uplink chirped sine wave signal and a predetermined uplink carrier frequency to provide an upconverted signal;
inject the upconverted signal into a radio frequency receive port of the RE such that the upconverted signal passes through the radio frequency interface of the RE to provide samples of the uplink chirped sine wave signal at an output of the radio frequency interface; and
wherein a downlink data path delay from the REC to the RE is determined based on results of the correlation of the samples of the radio frequency output signal and the reference chirped sine wave signal.

14. The system of claim 13 wherein the RE is further configured to determine the downlink data path delay from the REC to the RE based on the results of the correlation of the samples of the radio frequency output signal and the reference chirped sine wave signal.

15. The system of claim 13 wherein:
the RE is further configured to provide, to the REC, the results of the correlation of the samples of the radio frequency output signal and the reference chirped sine wave signal; and
the REC is further configured to determine the downlink data path delay from the REC to the RE based on the results of the correlation of the samples of the radio frequency output signal and the reference chirped sine wave signal.

16. The system of claim 13 wherein the downlink data path delay is a delay from a transmit reference point in the REC to the radio frequency transmit port of the RE.

17. The system of claim 13 wherein the downlink data path traverses one or more nodes between the REC and the RE in the asynchronous communication network.

18. The system of claim 13 wherein the REC is further configured to transmit the downlink chirped sine wave signal from the REC to the RE on the downlink data path from the REC to the RE and the RE is further configured to determine the downlink data path delay from the REC to the RE once in a predetermined period.

19. The system of claim 13 wherein the predetermined period is a single radio frame.

20. The system of claim 1 wherein the asynchronous communication network is an Ethernet network.

21. The system of claim 20 wherein the Ethernet network is encrypted.

22. The system of claim 21 wherein the Ethernet network includes an Internet Protocol Security, IPsec, tunnel.

23. A Radio Equipment, RE, comprising:
a radio frequency interface having a radio frequency transmit port and a radio frequency receive port;
a communication interface configured to communicatively couple the RE to a Radio Equipment Controller, REC via an asynchronous communication network; and
circuitry configured to:
mix an uplink chirped sine wave signal and a predetermined uplink carrier frequency to provide an upconverted signal;
inject the upconverted signal into the radio frequency receive port of the radio frequency interface such that the upconverted signal passes through the radio frequency interface of the RE to thereby provide samples of the uplink chirped sine wave signal at an output of the radio frequency interface; and
transmit the samples of the uplink chirped sine wave signal on an uplink data path from the RE to the REC via the communication interface via the asynchronous communication network.

24. The RE of claim 23 wherein the uplink data path delay is a delay from a radio frequency receive port of the RE to a receive reference point in the REC.

25. The RE of claim 23 wherein the circuitry is further configured to:
receive a signal on a downlink data path from the REC to the RE via the asynchronous communication network, the signal comprising a downlink chirped sine wave signal transmitted by the REC on the downlink data path from the REC to the RE;
pass the signal received on the downlink data path through the radio frequency interface of the RE to provide a radio frequency output signal at the radio frequency transmit port of the RE;
sample the radio frequency output signal to provide samples of the radio frequency output signal; and
correlate the samples of the radio frequency output signal and a reference chirped sine wave signal.

26. The RE of claim 25 wherein the circuitry is further configured to determine a downlink data path delay from the REC to the RE based on results of the correlation of the samples of the radio frequency output signal and the reference chirped sine wave signal.

27. The RE of claim 25 wherein the RE is further configured to provide, to the REC, results of the correlation of the samples of the radio frequency output signal and the reference chirped sine wave signal.

28. The RE of claim 23 wherein the communication interface is an Ethernet interface.

29. The RE of claim 23 wherein the RE is further configured to transmit the uplink chirped sine wave signal from the RE to the REC on the uplink data path from the RE to the REC via the asynchronous communication network once in a predetermined period.

30. A Radio Equipment Controller, REC, comprising:
   a communication interface configured to communicatively couple the REC to a Radio Equipment, RE via an asynchronous communication network; and
   circuitry configured to:
      receive a signal on an uplink data path via the asynchronous communication network comprising samples of an uplink chirped sine wave signal transmitted from the RE to the REC on the uplink data path;
      correlate the samples of the received signal and a reference chirped sine wave signal; and
      determine an uplink data path delay from the RE to the REC based on results of the correlation of the samples of the received signal and the reference chirped sine wave signal.

31. The REC of claim 30 wherein the uplink data path delay is a delay from a radio frequency receive port of the RE to a receive reference point in the REC.

32. The REC of claim 30 wherein the circuitry is further configured to transmit a downlink chirped sine wave signal from the REC to the RE on a downlink data path from the REC to the RE via the communication interface via the asynchronous communication network.

33. The REC of claim 30 wherein the communication interface is an Ethernet interface.

34. The REC of claim 30 wherein the REC is further configured to correlate the reference chirped sine wave signal and the received signal from the RE and determine the uplink data path delay from the RE to the REC once in a predetermined period.

* * * * *